(12) United States Patent
Ho

(10) Patent No.: US 11,435,850 B2
(45) Date of Patent: Sep. 6, 2022

(54) TOUCH SENSITIVE PROCESSING APPARATUS AND METHOD THEREOF AND TOUCH SYSTEM

(71) Applicant: EGALAX_EMPIA TECHNOLOGY INC., Taipei (TW)

(72) Inventor: Shun-Lung Ho, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 17/350,419

(22) Filed: Jun. 17, 2021

(65) Prior Publication Data

US 2021/0397322 A1 Dec. 23, 2021

(30) Foreign Application Priority Data

Jun. 17, 2020 (TW) .................................. 109120594
Dec. 25, 2020 (TW) .................................. 109146431

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0445* (2019.05); *G06F 3/0446* (2019.05)

(58) Field of Classification Search
CPC combination set(s) only.
See application file for complete search history.

(56) References Cited

U.S. PATENT DOCUMENTS

2019/0155451 A1* 5/2019 Yeh .......................... G06F 3/038

* cited by examiner

*Primary Examiner* — Deeprose Subedi
(74) *Attorney, Agent, or Firm* — WPAT, PC

(57) ABSTRACT

The present application provides a touch panel, sequentially comprising a third electrode layer, a dielectric layer, a second electrode layer, a flexible dielectric layer and a first electrode layer, wherein the third electrode layer comprises multiple third electrodes in parallel to a first axis, the second electrode layer comprises multiple second electrodes in parallel to a second axis, the first electrode layer comprises multiple first electrodes in parallel to the first axis, multiple intersection areas are formed by each of the first electrodes and the multiple second electrodes, multiple intersection areas are formed by each of the second electrodes and the multiple third electrodes, the multiple third electrodes are closer to an external conducting object than the multiple first electrodes.

19 Claims, 10 Drawing Sheets

120

TOUCH SENSITIVE PROCESSING APPARATUS AND METHOD THEREOF AND TOUCH SYSTEM

CROSS REFERENCE TO RELATED PATENT APPLICATION

This patent application is based on a Taiwan, R.O.C. patent application No. 109120594 filed on Jun. 17, 2020 and another Taiwan. R.O.C. patent application No. 109146431 filed on Dec. 25, 2020.

FIELD OF THE INVENTION

The present invention relates to touch sensitive technique, and more particularly, to touch screen for determining whether an external conductive object is approximating or touching and related techniques.

BACKGROUND OF THE INVENTION

Modern electronic systems equipping with touch panels or touch screens are increasing common. Hereinafter, the present application uses the term touch screen to refer to touch panel and touch screen. User can use an external conductive object approximating or touching a touch screen to create an approximating or touching event to input information. In order to increase functionalities, electronic systems can react differently in respect to an approximating event and a touching event.

However, when an external conductive object approximating or touching a capacitance sensing touch screen, traditional touch sensitive processing apparatus cannot distinguish whether the detected event is an approximating event or a touching event. Thus, there exists a need of a touch screen for determining whether an external conductive object is approximating or touching and related techniques.

SUMMARY OF THE INVENTION

An objective of the present invention is to provide

According to an embodiment of the present invention, a touch sensitive processing method is provided. The touch sensitive processing method applicable to a touch panel which sequentially includes a layer of third electrodes, an elastic dielectric layer and at least one layer of touch electrodes, wherein the layer of third electrodes includes multiple parallel third electrodes, the at least one layer of touch electrodes includes multiple first electrodes in parallel to a first axis and multiple second electrodes in parallel to a second axis, each of the first electrode intersects with the second electrodes, wherein the touch sensitive method comprising: performing self-capacitance sensing via the third electrodes in order to get an one-dimensional array composing sensing information corresponding to each of the third electrodes; detecting a first approximating event corresponding to a first conductive object according to the one-dimensional array and a base one-dimensional array, wherein a distance between the layer of third electrodes and the first conductive object is less than a distance between the layer of touch electrodes and first conductive object; and when the first approximating event is detected, performing following steps: performing mutual-capacitance sensing via the first electrodes and the second electrodes in order to get a two-dimensional array; detecting a first touching event corresponding to the first external conductive object according to the two-dimensional array; and reporting the first approximating event to a host when the first touching event is not detected.

According to one embodiment of the present application, a touch sensitive processing apparatus is provided. The touch sensitive processing apparatus applicable to a touch panel which sequentially includes a layer of third electrodes, an elastic dielectric layer and at least one layer of touch electrodes, wherein the layer of third electrodes includes multiple parallel third electrodes, the at least one layer of touch electrodes includes multiple first electrodes in parallel to a first axis and multiple second electrodes in parallel to a second axis, each of the first electrode intersects with the second electrodes, wherein the touch sensitive apparatus comprising: an interconnection network module, configured to connect to one or more of the first, the second and the third electrodes; a driving circuit module, configured to transmit driving signals via the interconnection network module; a sensing circuit module, configured to sense induced driving signals via the interconnection network module; a processor module, coupled to the interconnection network module, the driving circuit module and the sensing circuit module, configured to execute instructions stored in non-volatile memory to realize following steps: have the driving circuit module and the sensing circuit module through the interconnection network performing self-capacitance sensing via the third electrodes in order to get an one-dimensional array composing sensing information corresponding to each of the third electrodes; detecting a first approximating event corresponding to a first conductive object according to the one-dimensional array and a base one-dimensional array, wherein a distance between the layer of third electrodes and the first conductive object is less than a distance between the layer of touch electrodes and first conductive object; and when the first approximating event is detected, performing following steps: have the driving circuit module and the sensing circuit module through the interconnection network performing mutual-capacitance sensing via the first electrodes and the second electrodes in order to get a two-dimensional array; detecting a first touching event corresponding to the first external conductive object according to the two-dimensional array; and reporting the first approximating event to a host when the first touching event is not detected.

According to an embodiment of the present invention, a touch system is provided. The touch system comprising the aforementioned touch panel and the touch sensitive processing apparatus.

According to an embodiment of the present invention, a touch sensitive processing method is provided. The touch sensitive processing method applicable to a touch panel which sequentially includes a layer of third electrodes, an elastic dielectric layer and at least one layer of touch electrodes, wherein the layer of third electrodes includes multiple parallel third electrodes, the at least one layer of touch electrodes includes multiple first electrodes in parallel to a first axis and multiple second electrodes in parallel to a second axis, each of the first electrode intersects with the second electrodes, wherein the touch sensitive method comprising: performing self-capacitance sensing via the third electrodes in order to get a first one-dimensional array composing sensing information corresponding to each of first ends of the third electrodes, and performing self-capacitance sensing via the third electrodes in order to get a second one-dimensional array composing sensing information corresponding to each of second ends of the third electrodes; detecting a first approximating event corresponding to a first conductive object according to the first one-dimensional array and the second one-dimensional array, wherein a distance between the layer of third electrodes and the first conductive object is less than a distance between the layer of touch electrodes and first conductive object; and when the first approximating event is detected, performing following steps: performing mutual-capacitance sensing via the first electrodes and the second electrodes in order to get a two-dimensional array; detecting a first touching event corresponding to the first external conductive object according to the two-dimensional array; and reporting the first approximating event to a host when the first touching event is not detected.

According to an embodiment of the present invention, a touch sensitive processing apparatus is provided. The touch sensitive processing apparatus applicable to a touch panel which sequentially includes a layer of third electrodes, an elastic dielectric layer and at least one layer of touch electrodes, wherein the layer of third electrodes includes multiple parallel third electrodes, the at least one layer of touch electrodes includes multiple first electrodes in parallel to a first axis and multiple second electrodes in parallel to a second axis, each of the first electrode intersects with the second electrodes, wherein the touch sensitive apparatus comprising: an interconnection network module, configured to connect to one or more of the first electrodes, the second electrodes, first ends and second ends of the third electrodes; a driving circuit module, configured to transmit driving signals via the interconnection network module; a sensing circuit module, configured to sense induced driving signals via the interconnection network module; a processor module, coupled to the interconnection network module, the driving circuit module and the sensing circuit module, configured to execute instructions stored in non-volatile memory to realize following steps: have the driving circuit module and the sensing circuit module through the interconnection network performing self-capacitance sensing via the third electrodes in order to get a first one-dimensional array composing sensing information corresponding to each of the first ends of the third electrodes, and have the driving circuit module and the sensing circuit module through the interconnection network performing self-capacitance sensing via the third electrodes in order to get a second one-dimensional array composing sensing information corresponding to each of the second ends of the third electrodes; detecting a first approximating event corresponding to a first conductive object according to the first one-dimensional array and the second one-dimensional array, wherein a distance between the layer of third electrodes and the first conductive object is less than a distance between the layer of touch electrodes and first conductive object; and when the first approximating event is detected, performing following steps: have the driving circuit module and the sensing circuit module through the interconnection network performing mutual-capacitance sensing via the first electrodes and the second electrodes in order to get a two-dimensional array; detecting a first touching event corresponding to the first external conductive object according to the two-dimensional array; and reporting the first approximating event to a host when the first touching event is not detected.

According to an embodiment of the present invention, a touch system is provided. The touch system comprising the aforementioned touch panel and the touch sensitive processing apparatus.

According to an embodiment of the present invention, a touch sensitive method is provided. The touch sensitive processing method applicable to a touch panel which sequentially includes a layer of third electrodes, a dielectric layer, a layer of second electrodes, an elastic dielectric layer and a layer of first electrodes, wherein the layer of third electrodes includes multiple third electrodes in parallel to a first axis, the layer of second electrodes includes multiple second electrodes in parallel to a second axis, the layer of first electrodes includes multiple first electrodes in parallel to the first axis, each of the first electrode intersects with the second electrodes, each of the second electrode intersects with the third electrodes, the third electrodes are closer to an external conductive object than the first electrodes, wherein the touch sensitive method comprising: connecting the first electrodes to a fixed potential; taking turns to drive the second electrodes while sensing via the third electrodes in order to get multiple one-dimensional arrays of third-electrode sensing information; forming a two-dimensional array of third-electrode sensing information by the one-dimensional arrays of third-electrode sensing information according to the second electrodes corresponding to the one-dimensional arrays of third-electrode sensing information; and calculating an approximating event according to the two-dimensional array of third-electrode sensing information.

According to an embodiment of the present invention, a touch sensitive processing apparatus is provided. The touch sensitive processing apparatus applicable to a touch panel which sequentially includes a layer of third electrodes, a dielectric layer, a layer of second electrodes, an elastic dielectric layer and a layer of first electrodes, wherein the layer of third electrodes includes multiple third electrodes in parallel to a first axis, the layer of second electrodes includes multiple second electrodes in parallel to a second axis, the layer of first electrodes includes multiple first electrodes in parallel to the first axis, each of the first electrode intersects with the second electrodes, each of the second electrode intersects with the third electrodes, the third electrodes are closer to an external conductive object than the first electrodes, wherein the touch sensitive apparatus comprising: an interconnection network module, configured to connect to one or more the first electrodes, one or more the second electrodes and one or more the third electrodes, respectively; a driving circuit module, configured to emit driving signals via the interconnection network module; a sensing circuit module, configured to sensing induced driving signals via the interconnection network module; and a processor module, coupled to the interconnection network module, the driving circuit module and the sensing circuit module, configured to execute instructions stored in volatile memory to realize following steps: connecting the first electrodes to a fixed potential; having the driving circuit module taking turns to drive the second electrodes while having the sensing circuit module sensing via the third electrodes in order to get multiple one-dimensional arrays of third-electrode sensing information; forming a two-dimensional array of third-electrode sensing information by the one-dimensional arrays of third-electrode sensing information according to the second electrodes corresponding to the one-dimensional arrays of third-electrode sensing information; and calculating an approximating event according to the two-dimensional array of third-electrode sensing information.

According to an embodiment of the present invention, a touch system is provided. The touch system comprising the aforementioned touch panel and the touch sensitive processing apparatus.

According to an embodiment of the present invention, a touch sensitive processing method is provided. The touch sensitive processing method applicable to a touch panel which sequentially includes a layer of third electrodes, a dielectric layer, a layer of second electrodes, an elastic dielectric layer and a layer of first electrodes, wherein the layer of third electrodes includes multiple third electrodes in parallel to a first axis, the layer of second electrodes includes multiple second electrodes in parallel to a second axis, the layer of first electrodes includes multiple first electrodes in parallel to the first axis, each of the first electrode intersects with the second electrodes, each of the second electrode intersects with the third electrodes, the third electrodes are closer to an external conductive object than the first electrodes, wherein the touch sensitive method comprising: connecting the third electrodes to a fixed potential; taking turns to drive the second electrodes while sensing via the first electrodes in order to get multiple one-dimensional arrays of first-electrode sensing information; forming a two-dimensional array of first-electrode sensing information by the one-dimensional arrays of first-electrode sensing information according to the second electrodes corresponding to the one-dimensional arrays of first-electrode sensing information; calculating a touching event according to the two-dimensional array of first-electrode sensing information; and reporting the touching event to a host.

According to an embodiment of the present invention, a touch sensitive processing apparatus is provided. The touch sensitive processing apparatus applicable to a touch panel which sequentially includes a layer of third electrodes, a dielectric layer, a layer of second electrodes, an elastic dielectric layer and a layer of first electrodes, wherein the layer of third electrodes includes multiple third electrodes in parallel to a first axis, the layer of second electrodes includes multiple second electrodes in parallel to a second axis, the layer of first electrodes includes multiple first electrodes in parallel to the first axis, each of the first electrode intersects with the second electrodes, each of the second electrode intersects with the third electrodes, the third electrodes are closer to an external conductive object than the first electrodes, wherein the touch sensitive apparatus comprising: an interconnection network module, configured to connect to one or more the first electrodes, one or more the second electrodes and one or more the third electrodes, respectively; a driving circuit module, configured to emit driving signals via the interconnection network module; a sensing circuit module, configured to sensing induced driving signals via the interconnection network module; and a processor module, coupled to the interconnection network module, the driving circuit module and the sensing circuit module, configured to execute instructions stored in volatile memory to realize following steps: connecting the third electrodes to a fixed potential; having the driving circuit module taking turns to drive the second electrodes while the sensing circuit module sensing via the first electrodes in order to get multiple one-dimensional arrays of first-electrode sensing information; forming a two-dimensional array of first-electrode sensing information by the one-dimensional arrays of first-electrode sensing information according to the second electrodes corresponding to the one-dimensional arrays of first-electrode sensing information; calculating a touching event according to the two-dimensional array of first-electrode sensing information; and reporting the touching event to a host.

According to an embodiment of the present invention, a touch system is provided. The touch system comprising the aforementioned touch panel and the touch sensitive processing apparatus.

The touch system, the touch sensitive processing apparatus and method provided by the present application can distinguish whether the external conductive object approximates or contacts the touch screen so as the host can increase types of responsive activities with respect to different kinds of input corresponding to one position. Thus, the functionalities of the touch system are increased to enrich user's experience.

BRIEF DESCRIPTION OF THE DRAWINGS

The advantages and spirit related to the present invention can be further understood via the following detailed description and drawings.

DETAILED DESCRIPTION OF THE PREFERRED EMBODIMENT

Figure 1:
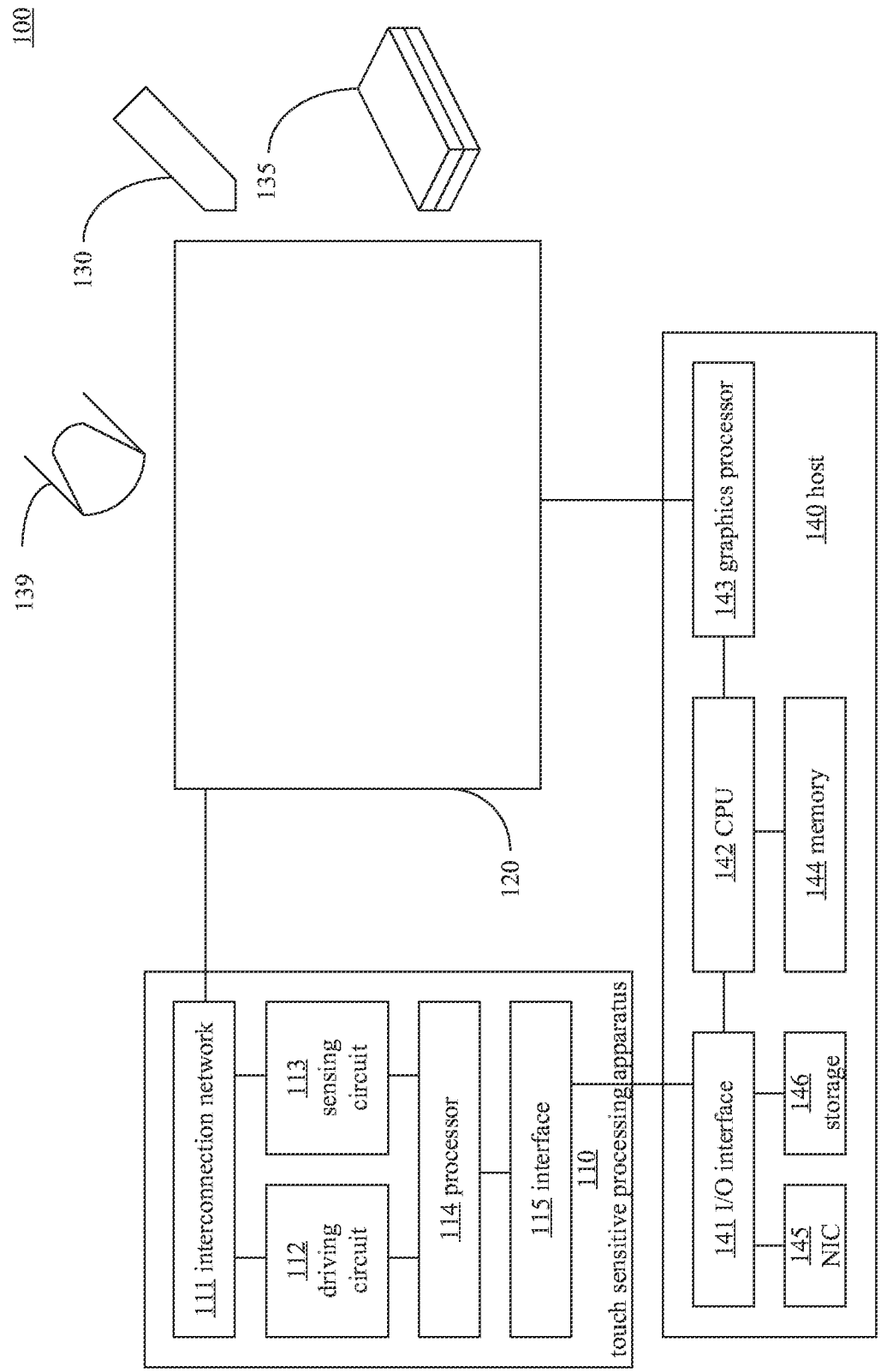
FIG. 1 shows a block diagram of a touch sensitive system in accordance with an embodiment of the present invention.

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

Please refer to FIG. 1, which shows a block diagram of a touch sensitive system 100 in accordance with an embodiment of the present invention. The touch sensitive system 100 may be normal desktop, laptop, tablet personal computer, industrial control computer, smart phone or any other computer system with touch sensitive function.

The touch sensitive system 100 may comprise a touch sensitive processing apparatus 110, a touch panel or touch screen 120 coupled to the touch sensitive processing apparatus 110 and a host 140 coupled to the touch sensitive processing apparatus 110. The touch sensitive system 100 may further comprises one or more styli 130 and/or touch board erasers 135. Hereinafter, the touch panel or screen 120 may be collectively referred as touch screen 120. However, in embodiments which are lack of display function, person has ordinary skill in the art can understand that the touch screen denoted in the present application is actually a touch panel.

The touch screen 120 comprises first electrodes 121 in parallel to a first axis and second electrodes 122 and one or more third electrodes 123 in parallel to a second axis. The first electrode 121 intersects with multiple of the second electrodes 122 in order to form multiple sensing points or areas. Similarly, the second electrode 122 intersects with multiple of the first electrodes 121 in order to form multiple sensing points or areas. In some embodiment, the present application uses first touch electrodes 121 to refer to the first electrodes 121, uses second touch electrodes 122 to refer to the second electrodes 122 and uses third touch electrodes 123 to refer to the third electrodes 123. The present application also calls touch electrodes to refer to the first electrodes 121, the second electrodes 122 and the third electrodes 123 collectively. In some embodiments, the first electrodes 121, the second electrodes 122 and the third electrodes 123 may be made by transparent materials. The first electrodes 121 and the second electrodes 122 may be placed in one electrode layer. Multiple conductive plates of each of the first electrodes 121 or the second electrodes 122 may be connected by bridging. Alternatively, the first electrodes 121 and the second electrodes 122 may be placed in two overlaid electrode layers. Unless specified particularly, the present application usually is applicable to single-layer or multiple-layer embodiments. The first axis is usually perpendicular to the second axis. However, the present application does not limit that the first axis has to be perpendicular to the second axis. In one embodiment, the first axis may be the horizontal axis or a refresh axis of the touch screen 120. In one embodiment, the quantity of the first electrodes 121 may equal to the quantity of the third electrodes 123. In one embodiment, a distance between center lines of two adjacent first electrodes 121 may equal to a distance between center lines of two adjacent third electrodes 123. However, an area of each first electrode 121 may not equal to an area of each third electrode 123. Alternatively, an area of the third electrode 123 may equal to an area of the first electrode 121.

Figure 2A:
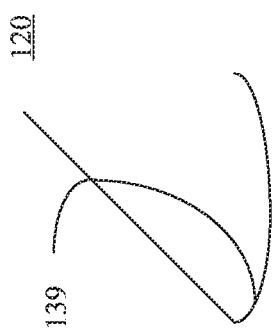
FIGS. 2A through 2C show profile diagrams of a touch screen 120 in accordance with three embodiments of the present invention.
Figure 2A:
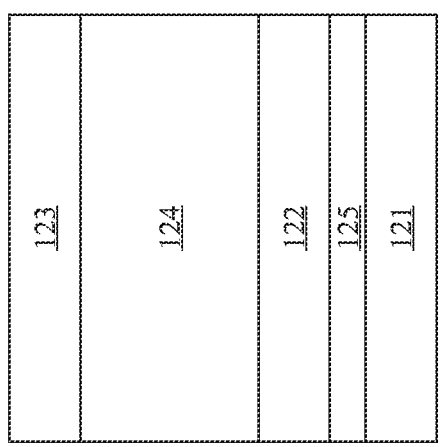

Please refer to FIG. 2A, which shows a profile diagram of a touch screen 120 in accordance with an embodiment of the present invention. The touch screen 120 includes an aforementioned structure, which sequentially includes a layer of the third electrodes 123, an elastic dielectric layer 124, a layer of the second electrodes 122, a dielectric layer 125 and a layer of the first electrodes 121. Person having ordinary skill in the art can understand that the touch screen may include other display structures or layers. However, in order to describe the present invention clearly, the other display structures or layers are omitted.

External conductive objects 139 such as fingers are closest to the layer of third electrodes 123. The elastic dielectric layer 123 is sandwiched by the layer of third electrodes 123 and the layer of second electrodes 122. It is configured to insulate the second electrodes 122 from the third electrodes 123. When an external conductive object 139 touches the touch screen 120 downwardly, the layer of third electrodes 123 and the elastic dielectric layer 124 are deformed by the downward force. Hence, the distance between the layer of third electrodes 123 and the layer of second electrodes 122 is shorten accordingly. The capacitances between the second electrodes 122 and the third electrodes 123 are changed in response to the change of the distance.

Figure 2B:
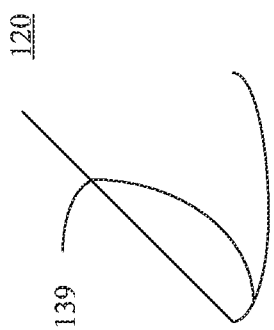
Figure 2B:
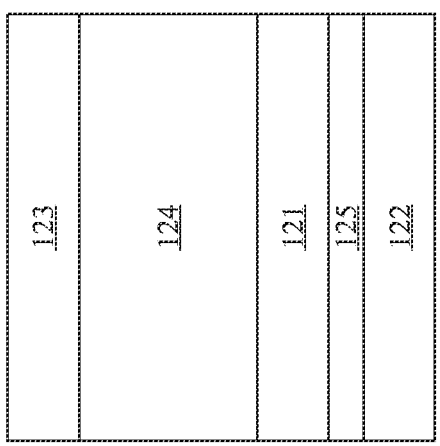

Please refer to FIG. 2B, which shows a profile diagram of a touch screen 120 in accordance with an embodiment of the present invention. Comparing with the embodiment as shown in FIG. 2A, the layer of first electrodes 121 and the layer of second electrodes 122 interchanges their places. The elastic dielectric layer 123 is sandwiched by the layer of third electrodes 123 and the layer of first electrodes 121. It is configured to insulate the first electrodes 121 from the third electrodes 123. When an external conductive object 139 touches the touch screen 120 downwardly, the layer of third electrodes 123 and the elastic dielectric layer 124 are deformed by the downward force. Hence, the distance between the layer of third electrodes 123 and the layer of first electrodes 121 is shorten accordingly. The capacitances between the first electrodes 121 and the third electrodes 123 are changed in response to the change of the distance.

Figure 2C:
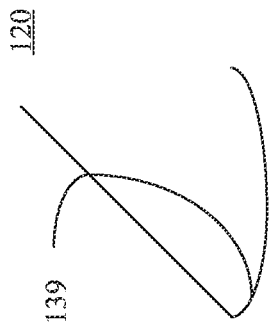
Figure 2C:
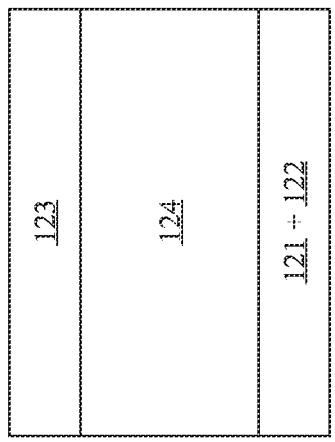

Please refer to FIG. 2C, which shows a profile diagram of a touch screen 120 in accordance with an embodiment of the present invention. Comparing with the embodiments as shown in FIGS. 2A and 2B, the first electrodes 121 and the second electrodes are disposed in one layer. Multiple conductive plates of each of the first electrodes 121 or each of the second electrodes 122 are connected by bridging. When an external conductive object 139 touches the touch screen 120 downwardly, the layer of third electrodes 123 and the elastic dielectric layer 124 are deformed by the downward force. Hence, the distance between the layer of third electrodes 123 and the layer of first electrodes 121 and the second electrodes 122 is shorten accordingly. The capacitances between the first electrodes 121 and the third electrodes 123 are changed in response to the change of the distance. The capacitances between the second electrodes 122 and the third electrodes 123 are also changed in response to the change of the distance.

In the embodiment as shown in FIG. 2A, since the layer of third electrodes 123 is closer to the layer of second electrodes 122, the third electrodes 123 may be with the first electrodes 121 in parallel to the first axis. In the embodiment as shown in FIG. 2B, since the layer of third electrodes 123 is closer to the layer of first electrodes 121, the third electrodes 123 may be with the second electrodes 122 in parallel to the second axis. However, the present application does not limit the third electrodes 123 being arranged to a different direction from its immediate underlying electrode layer.

The touch sensitive processing apparatus 110 may comprise following hardware circuit modules: an interconnection network module 111, a driving circuit module 112, a sensing circuit module 113, a processor module 114, and an interface module 115. The touch sensitive processing apparatus 310 may be implemented inside a single integrated circuit which may include one or more chips. It may use multiple integrated circuits and an interconnected circuit board carried the multiple integrated circuits to realize the touch sensitive processing apparatus 110. The touch sensitive processing apparatus 110 and the host 140 may be implemented in the same integrated circuits, or in the same chip. In other words, the present application does not limit how to implement the touch sensitive processing apparatus 110.

The interconnection network module 111 is configured to connect each of the multiple first electrodes 121, the multiple second electrodes 122 and/or the multiple third electrodes 123 of the touch screen 120. The interconnection network module 111 may accept control command of the processor module 114 for connecting the driving circuit module 112 and any one or more touch electrodes and for connecting the sensing circuit 113 and any one or more touch electrodes. The interconnection network module 111 may include a combination of one or more multiplexers (MUX) to realize the aforementioned functions.

Figure 3B:
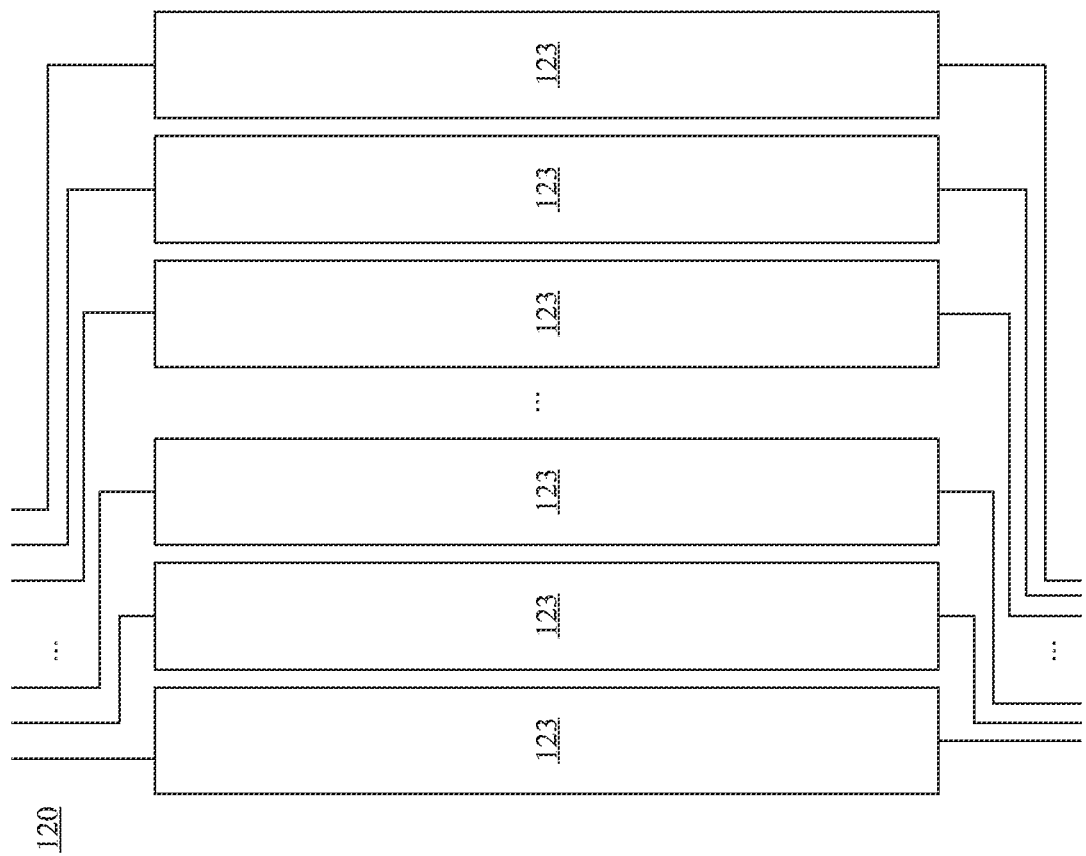
FIGS. 3A and 3B depict top views of the layers of third electrodes according to two embodiments of the present invention, respectively.
Figure 3A:
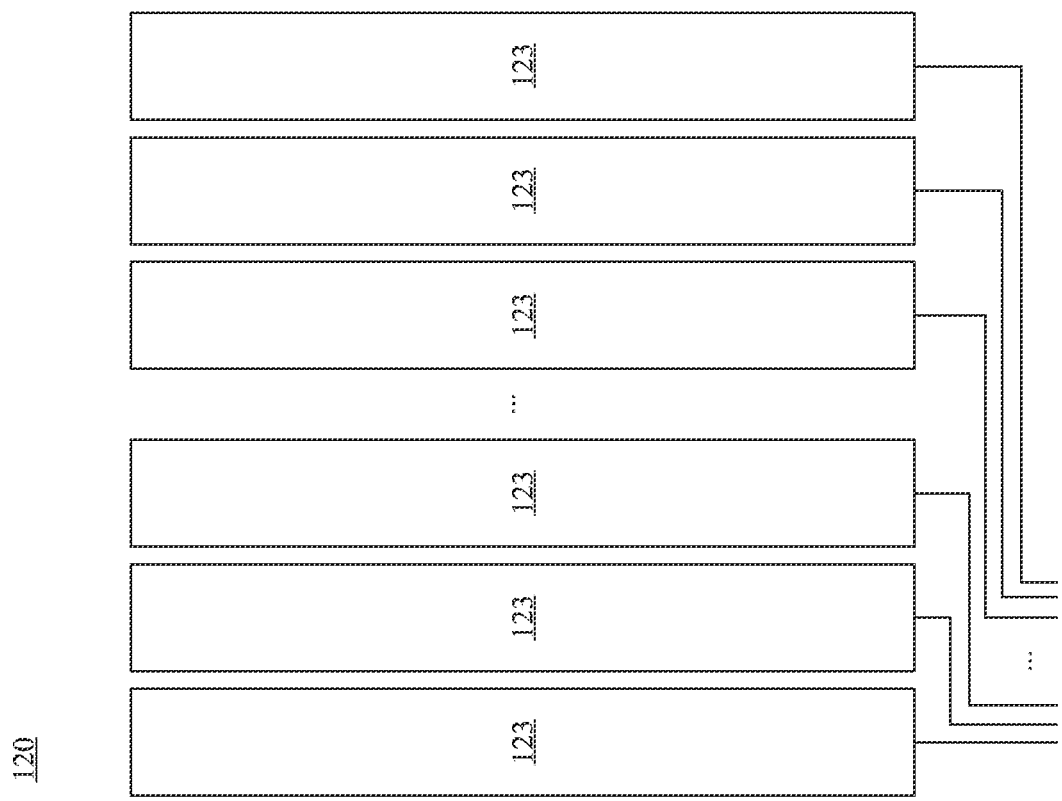

Please refer to FIGS. 3A and 3B which depict top views of the layers of third electrodes according to two embodiments of the present invention, respectively. The third electrodes 123 as shown in FIGS. 3A and 3B are in parallel to the first axis or the second axis. The total area of all the third electrodes 123 may occupy a percentage of the total area of the touch screen, where the percentage may be 80%, 85%, 90% or 90%. Why the percentage of the third electrodes 123 is so high would be provided in following paragraphs.

Each of the third electrodes 123 as shown in FIG. 3A connects with the interconnection network module 111 via a circuit coupled to an end of the third electrode 123. This kind of connection is named as "single routing." Each of the third electrodes 123 as shown in FIG. 3B connects with the interconnection network module 111 via circuits coupled to both ends of the third electrode 123. The kind of connection is named as "double routing." The interconnection network module 111 may connect the driving circuit module 112 and/or the sensing circuit module 113 with both ends of the third electrode 123 via the "double routing" connection.

Figure 4:
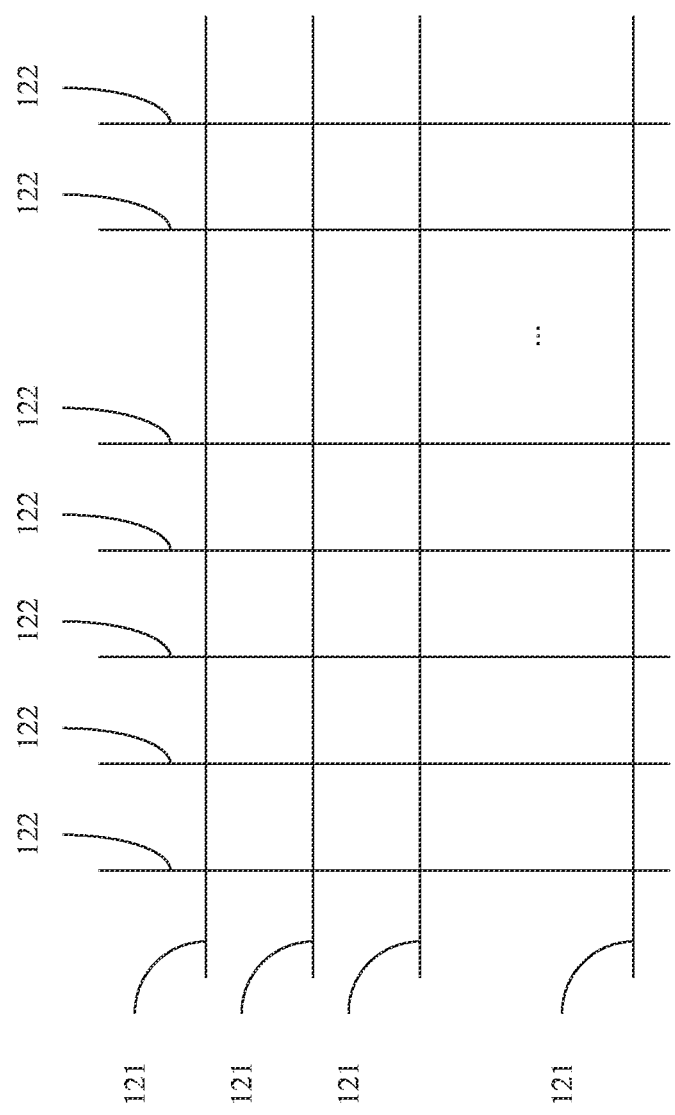
FIG. 4 illustrates a diagram of first electrodes and second electrodes in accordance with an embodiment of the present invention.

Please refer to FIG. 4, which illustrates a diagram of first electrodes and second electrodes in accordance with an embodiment of the present invention. FIG. 4 is a top view of the touch screen 120. When viewing the three structures of the touch screens as shown in FIGS. 2A through 2C from top, it would be shown in FIG. 4. The interconnection network module 111 may connect the driving circuit module 112 and/or the sensing circuit module 113 with one or more of the first electrodes 121 or the second electrodes 122, respectively. The present application does not limit whether it uses "single routing" or "double routing" to connect with the first electrodes 121 and the second electrodes 122.

The driving circuit module 112 may comprise clock generator, frequency divider, frequency multiplier, phase lock loop, power amplifier, DC-DC voltage converter, regulator and/or filter, which is configured to provide driving signal to any one or more touch electrodes via the interconnection network module 111 according to control commands of the processor module 114. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves or any modulated waves. The driving circuit module 112 may include one or more channel. Each channel may be connected to any one or more touch electrodes via the interconnection network module 111.

The sensing circuit module 113 may comprise clock generator, frequency divider, frequency multiplier, phase lock loop, power amplifier, DC-DC voltage converter, regulator and/or filter, which is configured to sense on any one or more touch electrodes via the interconnection network module 111 according to control commands of the processor module 114. When the touch signal is transmitted from one of the touch electrodes, another touch electrode may induce the touch signal. And the sensing circuit module 130 may demodulate the induced touch signal by the another touch electrode in accordance with the modulation method performed on the driving signal by the driving circuit module 112 in order to restore the messages carried by the driving signal. The sensing circuit module 113 may include one or more channels. Each channel may be connected to any one or more touch electrodes via the interconnection network module 111. In the same time, each channel may simultaneously perform sensing and demodulation.

In one embodiment, the sensing circuit module 113 may include differential circuits, subtraction circuits or any other equivalent circuits which may directly produce a difference value between measured signals of adjacent touch electrodes and output the difference value to the processor module 114. It may perform difference calculations on all of the first electrodes 121 or all of the third electrodes 123. Alternatively, in another embodiment, in addition to the circuits which produce difference values, the sensing circuit module may further include differential circuits, subtraction circuits or any other equivalent circuits which may which may directly prodyce a difference (or a dual-difference) between two differences between measured signals of three adjacent touch electrodes. For example, assuming there are three adjacent electrodes A, B and C, a first difference value is calculated as (A−B) and a second difference value is calculated as (B−C). A dual difference value of these two difference values is calculated as (A−B)−(B−C), i.e., A−2B+C. When measuring on N adjacent electrodes, (N−1) difference values and (N−2) dual difference values may be generated. When the sensing circuit module 113 preserves a sensing value of an edge touch electrode, N sensing values may be restored from the (N−1) difference values. When the sensing circuit module 113 preserves two sensing values of two edge touch electrodes, N sensing values may be restored from the (N−2) dual difference values. When an one-dimensional array is generated by the sensing circuit module 113 in the present application, the one-dimensional array may be include sensing values, difference values or dual-difference values.

In one embodiment, the driving circuit module 112 and the sensing circuit module 113 may include analog front-end (AFE) circuits. In another embodiment, in additional to the AFE circuits, the driving circuit module 112 and the sensing circuit module 313 may include digital back-end (DBE) circuits. If the driving circuit module 112 and the sensing circuit module 113 include only the AFE circuits, the DBE circuits may be implemented in the processor module 114. The aforementioned calculations of difference values and dual difference values may be implemented by AFE or DBE. When applying AFE to realize the calculations of difference values and dual difference values, in case adjacent electrodes are interfered by similar noise signals and the sensors are saturated by the interference signals, the sensing circuits which directly generate difference values may not be influenced. Hence, applying AFE to realize the sensing of difference values and dual difference values is adaptably for stronger interference signals. For example, the touch electrodes may be more closer to a display screen having stronger interference signals without seriously influenced by the electromagnetic interference from the display screen.

The processor module 114 may include a digital signal processor for connecting the AFE circuits or the DBE circuits of the driving circuit module 112 and the sensing circuit module 113, respectively. The processor module 114 may include an embedded processor, non-volatile memories and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network module 111, the driving circuit module 112, the sensing circuit module 113 and the interface module 115 of the touch sensitive processing apparatus 110. For examples, the processor module 114 may comprises processors widely adopted in the industry such as 8051 series, Intel i960 series, ARM Cortex-M series and etc. The present application does not limit types and numbers of processors included in the processor module 314.

The instructions and data may be used to implement each of steps mentioned in the present application and flows and methods constructed by the steps. Some instructions may be executed independently inside the processor module 114, for examples, arithmetic and log operation instructions. Other instructions may be used to control other modules of the touch sensitive processing apparatus 110. These instructions may include input/output interfaces of the processor module 114 to control other modules. Other modules may provide information via the input/output interface of the processor module 114 to the OS and/or application programs executed by the processor module 114. Persons having ordinary skill in the art should have common knowledge of computer organization and architecture which enabling them to understand that the flows and methods provided by the present application can be realized by the modules and the instructions.

The interface module 115 may include kinds of serial or parallel bus, such as universal serial bus (USB), I²C, peripheral component interconnect (PCI), PCI-Express, IEEE 1394 and other industrial standard input/output interface. The touch sensitive processing apparatus 110 connects to the host 140 via the interface module 115.

The touch system 300 may comprise one or more styli 130 and/or touch erasers 135. The stylus 130 and touch eraser 135 may be transmitters which emit electrical signals. The transmitters may include active transmitter which actively emits electrical signals or passive transmitter which emits electrical signals in response to outside electrical signals. The stylus 130 and touch eraser 135 may comprise one or more electrodes which is configured to receive electrical signals from the touch screen synchronously or asynchronously, or to transmit electrical signals to the touch screen synchronously or asynchronously. The electrical signals may be modulated according to one or more of the aforementioned modulation methods.

The stylus 130 or touch eraser 135 may be conductor which is configured to transmit driving signals or to be grounded via user's hand or body. The stylus 130 or touch eraser 135 may be wired or wirelessly connected to an I/O interface module 141 of the host 140 or any other underlying modules of the I/O interface module 141.

The touch sensitive processing apparatus 110 may detect one or more external conductive objects 139 such as fingers, palms or passive styli 130 or touch erasers 135 or styli 130 or touch erasers 135 emitting electrical signals via the touch screen 120. The touch sensitive processing apparatus 110 may utilize mutual-capacitance or self-capacitance principles to detect external conductive objects. The styli 330 or touch erasers 335 and touch sensitive processing apparatus 110 may use the aforementioned modulation and demodulation methods to transmit message via the electrical signals. The touch sensitive processing apparatus 110 may detect one or more positions where the stylus 130 or touch erasers 135 touches or approximates the touch screen 120, status or sensors (pressure sensor or button) onboard the stylus 130 or touch eraser 135, orientation angle or inclination angle of the stylus 130 or touch erasers 135 with respect to the touch screen 120 and etc. according to the electrical signals.

The host 140 is a main apparatus for controlling the touch system 100. It may comprises an input/output interface module 141 for connecting the interface module 115, a central processing unit (CPU) module 142, a graphics processor module 143, a memory module 144 connects to the CPU module 142, a network interface module 145 and a storage module 146 connect to the input/output interface module 141.

The storage module 146 comprises non-volatile memory. Common examples are hard disks, electronic erasable rewritable read only memory (EEPROM), or flash memory. The storage module 146 may store normal operating system and application programs executable under the operating system. The network interface module 145 may comprise wired or wireless hardware network interface. The network interface module 145 may be compliant to common industrial standards such as IEEE 802.11 Wireless Local Area Network, IEEE 802.3 Local Area Network, 3G, 4G and/or 5G wireless telecommunication standards, Bluetooth wireless communication standards, and etc.

The CPU module 142 may directly or indirectly connects to the input/output interface module 141, the graphics processor module 143, the memory module 144, the network interface module 145 and one storage module 146. The CPU module 142 may comprises one or more processor or processor cores. Common processors may include Intel, AMD, VIA's x86 and x64 instruction set architecture (ISA) processors, Apple, Qualcomm, Mediatek's ARM ISA processors, or any other types of complex instruction set computer (CISC) or reduced instruction set computer (RISC) processors. The OS and application programs include multiple instructions and data corresponding to the instruction set. By executing these instructions, the CPU module 142 is able to control other modules of the touch system 100.

The optional graphics processor module 143 is usually configured to handle computations with respect to graphics outputs. The graphics processor module 143 may connect to the touch screen 120 for controlling outputs of the touch screen 120. In some applications, the host 140 may have the CPU module 142 execute the computations with respect to graphics outputs, without dedicated handling of the graphics processor module 143.

The host 140 may comprise components or apparatus not shown in FIG. 1, for example, audio input/output interface, keyboard input interface, mouse input interface, track-ball input interface and/or any other hardware modules. Persons having ordinary skill in the art should have common knowledge of computer organization and architecture. They can understand the touch system 100 disclosed by the present application is exemplary. Parts regarding to the inventive feature provided by the present application should be referred to the specification and the claim.

Figure 5:
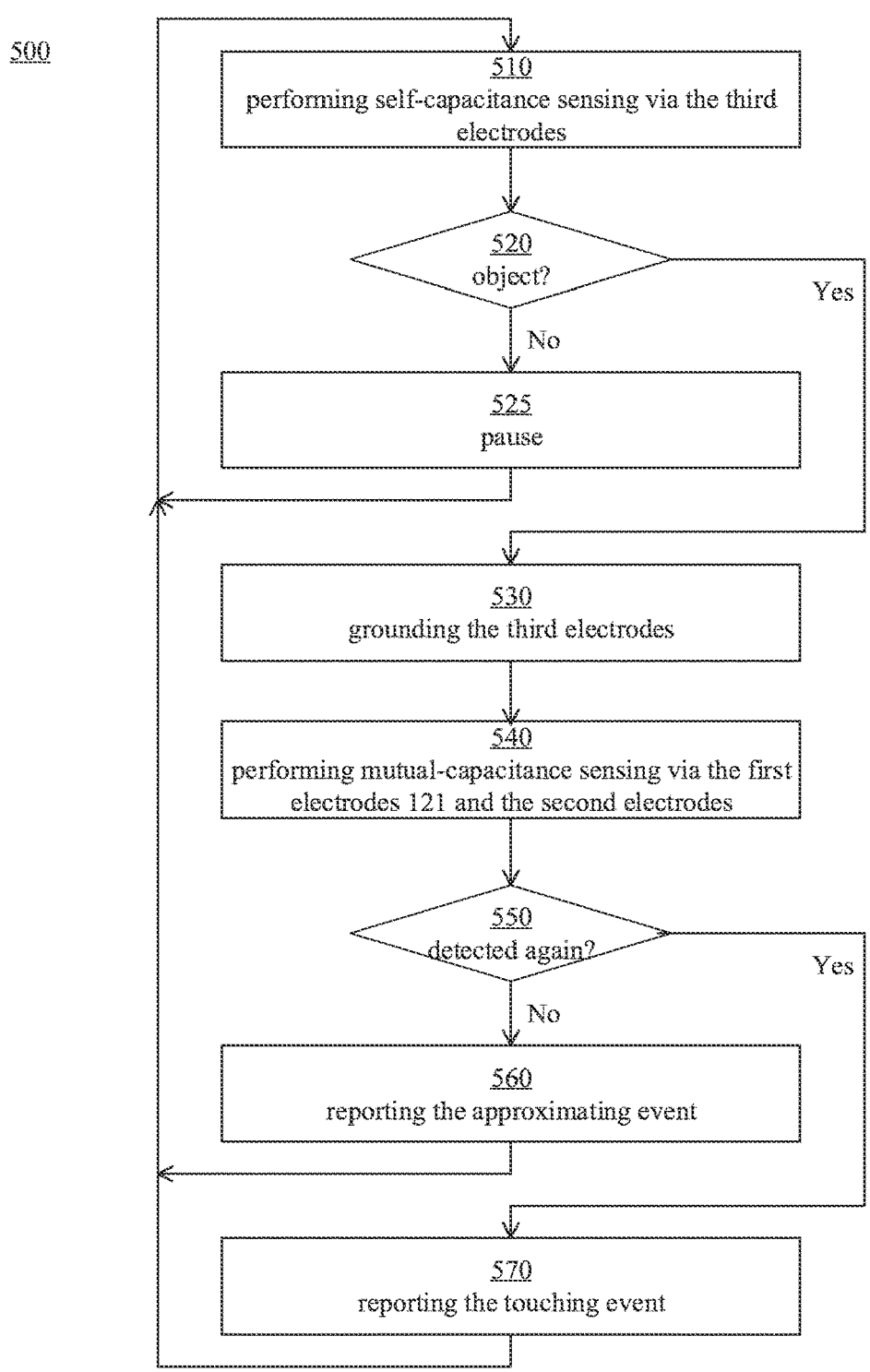
FIG. 5 depicts a flowchart diagram of a touch sensitive processing method in accordance with an embodiment of the present invention.

Please refer to FIG. 5, which depicts a flowchart diagram of a touch sensitive processing method 500 in accordance with an embodiment of the present invention. The touch sensitive processing method 500 may be implemented by the touch sensitive processing apparatus 110 which may apply to the "single routing" structure as shown in FIG. 3A and the three structures as shown in FIGS. 2A-2C, respectively. In one embodiment, the touch sensitive processing method 500 is realized by execution of a program stored in a non-volatile memory and executed by the processor module 114. Unless there exists a causal relationship, the present application does not limit execution sequence of any two steps.

Step 510: performing self-capacitance sensing via the third electrodes 123. In this step, it may have the driving circuit module 112 and the sensing circuit module 113 to perform self-capacitance sensing via one or more of the third electrodes 123 concurrently. Person having ordinary skill in the art can understand that the driving circuit module 112 may emit driving signals via each of the third electrodes 123. Simultaneously, the sensing circuit module 113 may measure the driving signals via each of the third electrodes 123. When one external conductive object 139 approximating one of the third electrodes 123, part of the driving signals induced by the third electrode 123 would be transferred to outside via the external conductive object 139. Hence, the driving signals measured via the third electrode 123 are changed accordingly.

Step 520: according to an one-dimensional array sensed by the step 510 and a base one-dimensional array which is sensed when no external conductive object approximating or touching, determining whether there is any element in the one-dimensional array changed significantly, i.e., determining whether any external conductive object approximating. If so, it is determined that an event of approximating happened, i.e., there exists an external conductive object approximating or touching the touch screen 120 nearby the third electrodes 123. Thus, the flow proceeds to step 530. When there is no element in the one-dimensional array changed significantly, it means that there is no event of approximating. Thus the flow proceeds to optional step 525 or returns back to step 510.

Optional step 525: since there is no external conductive object approximating or touching the touch screen 120, the sensing of external conductive object may be paused for a while. Then the flow returns back to step 510. In some embodiments, the step 525 may further comprise determining how many times that no external conductive object is detected. If the number exceeds a threshold, the time duration of the pause may be extended furthermore to reduce power consumption.

Step 530: grounding the third electrodes 123. In one embodiment, all of the third electrodes 123 may be grounded or connected to a certain direct current (DC) potential. In an alternative embodiment, the third electrodes 123 approximated or touched by the external conductive object 139 may be grounded or connected to a certain direct current (DC) potential.

Step 540: performing mutual-capacitance sensing via the first electrodes 121 and the second electrodes 122. In one embodiment, when all of the third electrodes 123 are grounded or connected to a certain direct current (DC) potential, person having ordinary skill in the art can understand that it may have the driving circuit module 112 takes turns to emit driving signals via the first electrodes 121 and may have the sensing circuit module 113 measures the driving signals induced by all of the second electrodes in order to get an one-dimensional array composed by multiple sensing information elements when each one of the first electrodes 121 is driven. When an external conductive object approximating or touching a point nearby an intersection of one of the first electrodes 121 and one of the second electrodes 122, the elastic dielectric layer 124 nearby the point is deformed accordingly so as the third electrodes nearby the point gets closer to the one of the second electrodes 122. Hence, part of the driving signals would be transferred to the external conductive object 139 via the grounded third electrodes 123 so as the driving signals sensed via the one of the second electrodes 122 is changed accordingly. Hence, the element of the one-dimensional array corresponding to the one of the second electrodes 122 is changed accordingly.

When each of the first electrodes 121 is driven, corresponding one-dimensional array can be measured. A two-dimensional array is composed by the multiple one-dimensional arrays according to positions of corresponding first electrodes 121. According to the two-dimensional array and a base two-dimensional array when no external conductive object 139 approximating or touching the touch screen, it may determine whether exists one or more touching events caused by one or more external conductive objects touching the touch screen 120. Each one of the touch events is corresponding to a point or a coordinate.

In an alternative embodiment, when only some of the third electrodes 123 are grounded or connected to a certain DC potential at step 530, mutual capacitance sensing may be performed at the area covered by these third electrodes 123, merely. For examples, with respect to the structures as shown in FIG. 2A or 2C, in case the first electrodes 121 and the third electrodes 123 are all in parallel to the first axis, the first electrodes 121 corresponding to the area where the third electrodes 123 are grounded can be found. Person having ordinary skilled in the art can understand that it may have the driving circuit module 112 takes turns to emit driving signals via the first electrodes 121. Similarly, by utilizing the aforementioned mutual capacitance sensing steps, a two-dimensional array corresponding to a part of the touch screen 120. Furthermore, it may determine whether exists one or more touching events caused by one or more external conductive objects touching the touch screen 120. Each one of the touch events is corresponding to a point or a coordinate.

Since different external conductive objects 139 may apply different pressures, the deformations of the elastic dielectric layer 124 may be different accordingly. When the second electrode 122 is getting closer to the third electrode 123, the change of the capacitance in between is getting larger. Hence, the pressure applied by the corresponding external conductive object 139 may be calculated according to the change of the capacitance. In one embodiment, a pressure value corresponding to each of the touching events can be calculated accordingly.

Step 550: according to the detection result got at the step 540, determining whether the touching event is detected. When the external conductive object 139 only approximates the touch screen 120 without contact, corresponding approximating event can be detected at the step 510. However, no corresponding touching event can be detected at the step 540. In this case, the flow proceeds to optional step 560 or returns to the step 510. When the corresponding approximating event is detected at the step 510 and the corresponding touching event is also detected at the step 540, the flow proceeds to the step 570.

Optional step 560: reporting the approximating event detected at the step 510 to the host 140. The approximating event reported in this step may include a position of the corresponding third electrode 123 with respect to the touch screen 120.

Step 570: reporting the touching event detected at the step 540 to the host 140. The touching event reported in this step may include its position or its coordinates. Corresponding pressure value may be also included.

Figure 6:
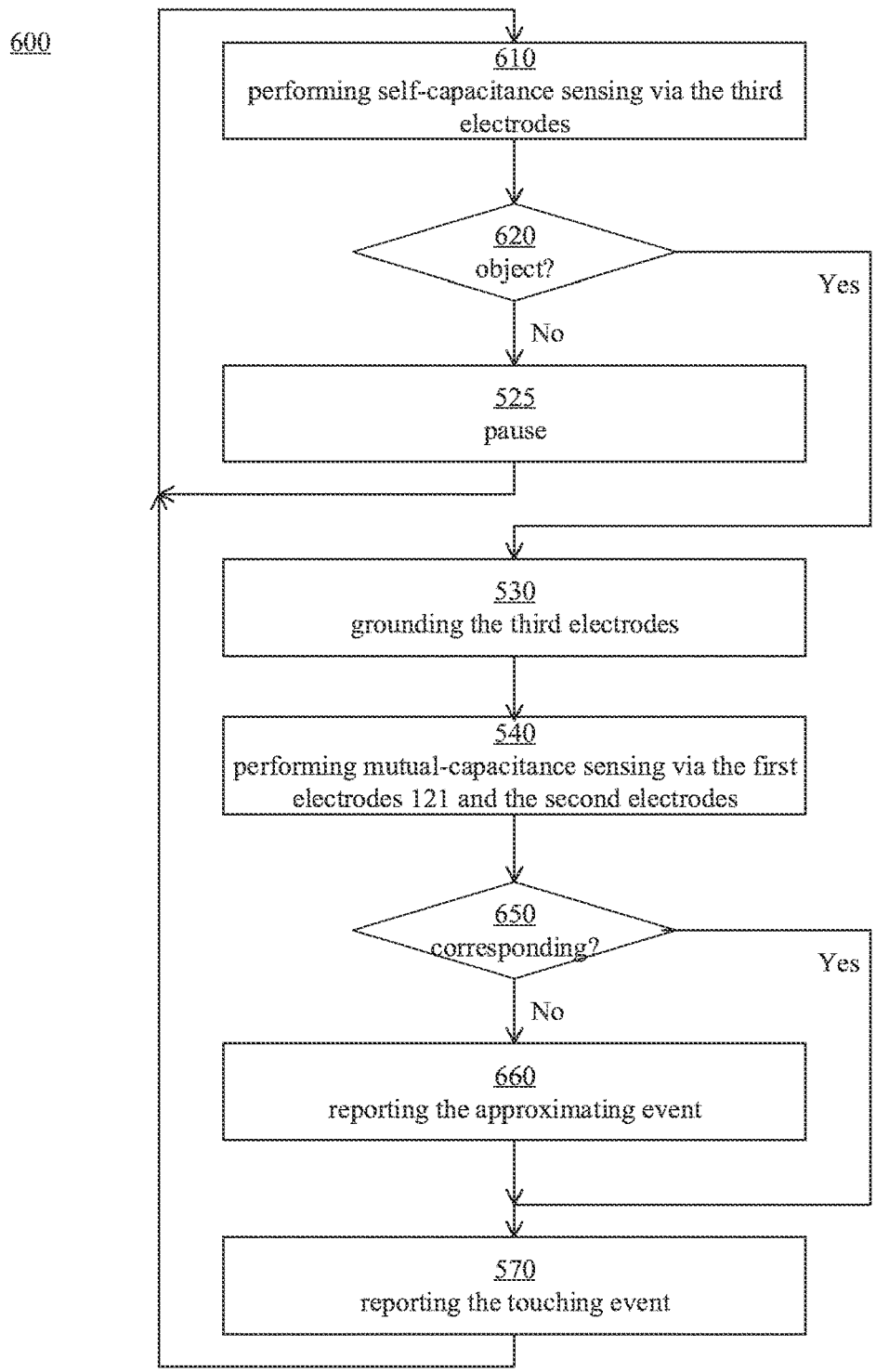
FIG. 6 depicts a flowchart diagram of a touch sensitive processing method in accordance with an embodiment of the present invention.

Please refer to FIG. 6, which shows a flowchart diagram of a touch sensitive processing method 600 in accordance with an embodiment of the present invention. The touch sensitive processing method 600 may be implemented by the touch sensitive processing apparatus 110 which may apply to the "double routing" structure as shown in FIG. 3B and the three structures as shown in FIGS. 2A-2C, respectively. In one embodiment, the touch sensitive processing method 600 is realized by execution of a program stored in a non-volatile memory and executed by the processor module 114. Unless there exists a causal relationship, the present application does not limit execution sequence of any two steps.

Step 610: performing self-capacitance sensing via the third electrodes 123. In this step, it may have the driving circuit module 112 and the sensing circuit module 113 to perform self-capacitance sensing via one or more of the third electrodes 123 concurrently. Person having ordinary skill in the art can understand that the driving circuit module 112 may emit driving signals via both ends of each of the third electrodes 123. Simultaneously, the sensing circuit module 113 may measure the driving signals via each of the third electrodes 123 to gather one-dimensional arrays including multiple sensing information elements. In other words, the sensing result corresponding to first ends of the third electrodes 123 are called first-end one-dimensional arrays. The sensing result corresponding to first ends of the third electrodes 123 are called second-end one-dimensional arrays. When one external conductive object 139 approximating one of the third electrodes 123, part of the driving signals induced by the third electrode 123 would be transferred to outside via the external conductive object 139. Hence, the driving signals measured via the third electrode 123 are changed accordingly. When the external conductive object is closer to the first end, the capacitance changes corresponding to the first-end sensing information and the second-end sensing information are different Assuming that the third electrodes 123 are in parallel to the first axis, a coordinate with respect to the first axis of the external conductive object 139 may be obtained according to differences between the first-end sensing information and the second-end sensing information. Or alternatively, a first capacitance change may be calculated according to the first-end sensing information and a base first-end sensing information, a second capacitance change may be calculated according to the second-end sensing information and a base second-end sensing information. At last, according to a difference between the first capacitance change and the second capacitance change, a coordinate value with respect to the first axis of the external conductive object 139 may be calculated accordingly.

Besides, since the multiple third electrodes are disposed along the second axis, a coordinate value with respect to the second axis of the external conductive object 139 may be calculated according to the first-end one-dimensional array and a base first-end one-dimensional array or according to the second-end one-dimensional array and a base second-end one-dimensional array.

Person having ordinary skill in the art can understand that in case two or more external conductive objects approximate the same third electrode 123, the aforementioned calculation is not appropriated to calculate positions of the approximating events. It only indicates that at least one approximating event is happened nearby the third electrode 123. In other words, the touch sensitive system provided by the present embodiment is able to detect an approximating position of a single external conductive object 139 and to detect two or more approximating positions of external conductive objects 139 which are near different third electrodes 123.

Step 620: determining whether an external conductive object approximates. If one or more approximating events are detected at step 610, it is determined that there exists at least one external conductive object 139 approximating. Thus, the flow proceeds to step 530. Otherwise, the flow proceeds to step 525.

Step 650: determining whether the approximating event is corresponding to a touching event. In theory, when a touching event is detected, there must be a corresponding approximating event detected at step 610. However, as discussed above, in case two or more external conductive objects approximate the same third electrode 123, the step 610 can only recognize that there is at least one approximating event. However, in step 540, two or more corresponding touching events may be detected. Hence, in case that the first-axis coordinate of the position of the approximating event is within a range of the first-axis coordinate of the position of the touching event, it is determined that the approximating event is corresponding to a touching event.

In this embodiment, in case that the approximating event is not being corresponding to a touching event, it implies that the external conductive object corresponding to the approximating event does not contact the touch screen 120. Hence, if so, the flow proceeds to step 660. Otherwise, the flow proceeds to step 570. In this embodiment, if a touching event is detected, its corresponding approximating event would not be reported.

Step 660: reporting the approximating event detected at step 610 to the host. As elaborated above, the touch system provided by this embodiment is able to detect one approximating position of a single external conductive object 139 and two or more approximating positions of two or more external conductive objects 139 which approximate two or more different third electrodes.

Figure 7:
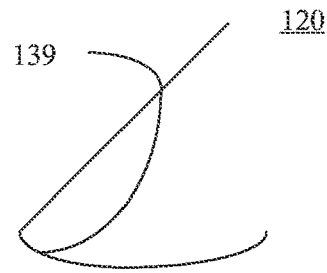
FIG. 7 shows a profile diagram of a touch screen in accordance with an embodiment of the present application.
Figure 7:
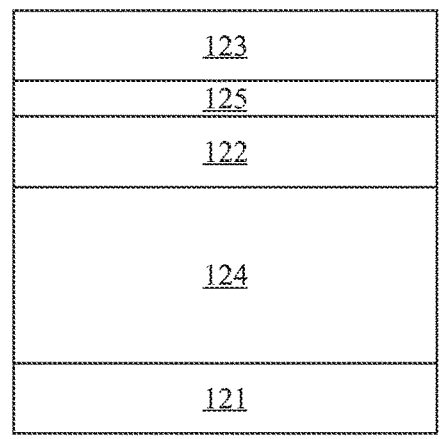

Please refer to FIG. 7, which shows a profile diagram of a touch screen 120 in accordance with an embodiment of the present application. Comparing with the embodiment as shown in FIG. 2A, the elastic dielectric layer 124 is sandwiched between the layer of first electrodes 121 and the layer of second electrodes 122 and the dielectric layer 125 is sandwiched between the layer of third electrodes 123 and the layer of second electrodes 122. It maintains that the layer of third electrodes 123 is closest to an external conductive object such as a finger. If not described otherwisely, components as shown in FIG. 7 are as discussed above.

Since the elastic dielectric layer 124 is disposed between the layer of first electrodes 121 and the layer of second electrodes 122, the touch screen 120 as shown in FIG. 7 is utilized to detect a touching position according to a change of a distance between the first electrodes 121 and the second electrodes 122 and to detect an approximating position according to mutual-capacitance changes between the second electrodes 122 and the third electrodes 123.

Figure 8:
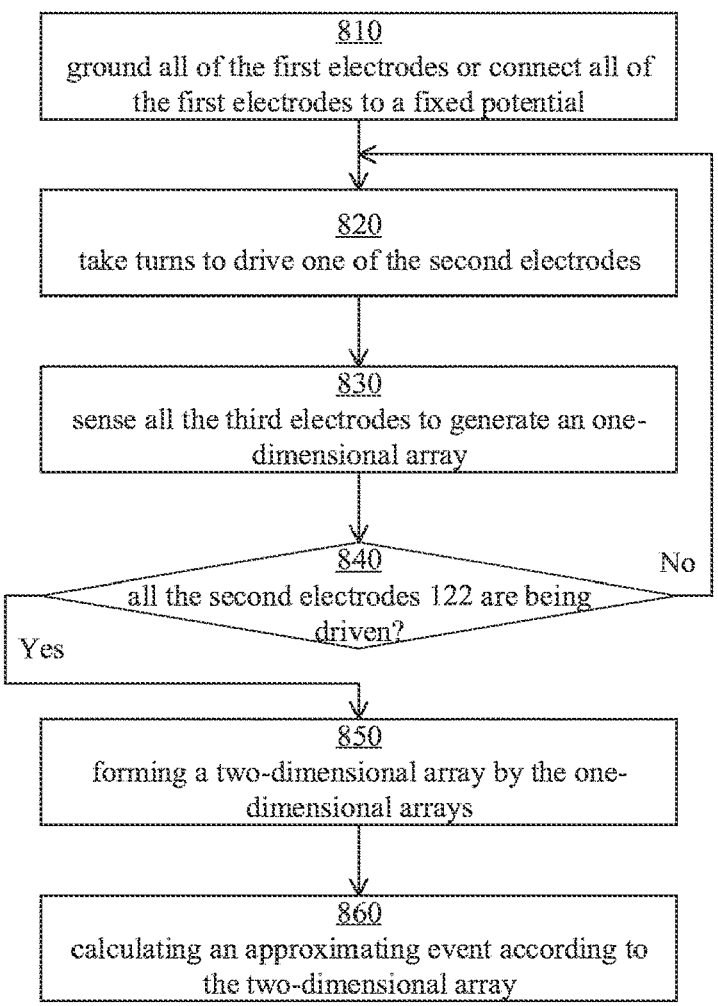
FIG. 8 depicts a flowchart diagram of a touch sensitive processing method according to an embodiment of the present invention.

Please refer to FIG. 8, which depicts a flowchart diagram of a touch sensitive processing method 800 according to an embodiment of the present invention. The touch sensitive processing method 800 may be implemented by the touch sensitive processing apparatus 110 and applicable to the embodiment as shown in FIG. 7. In one embodiment, the touch sensitive processing method 800 is implemented as instructions stored in non-volatile memory for execution by the processor module 114. Unless there exists a causal relation, the present application does not limit execution sequence between any two steps. The touch sensitive processing method 800 may begin from step 810 or step 820.

As mentioned above, the touch sensitive processing method 800 utilizes mutual-capacitance changes between the second electrodes 122 and the third electrodes 123 to detect a touching position. In order to increase sensitivities of mutual-capacitance effects, in one embodiment, an area of each third electrodes 123 may be increased. For examples, as elaborated in the embodiments as shown in FIGS. 3A and 3B, a total area of all the third electrodes 123 may occupy a proportion of an area of the touch screen 120. The proportion may be 80%, 85%, 90% or 95%. In an alternative embodiment, the total area of all the third electrodes 123 is larger than a total area of all the second electrodes 122. Or, the total area of all the third electrodes 123 is larger than a total area of all the first electrodes 121. Since areas of the third electrodes 123 are increased, areas of third electrodes 123 projected by the finger 139 is getting larger. Hence, more charges would be influenced by the finger 139 so as that chances of detecting the finger 139 are increased subsequently.

In an alternative embodiment, areas of each second electrodes 122 may be increased. a total area of all the second electrodes 122 may occupy a proportion of an area of the touch screen 120. The proportion may be 80%, 85%, 90% or 95%. In an alternative embodiment, the total area of all the second electrodes 122 is larger than a total area of all the third electrodes 123. Or, the total area of all the second electrodes 122 is larger than a total area of all the first electrodes 121. Since areas of the second electrodes 122 are increased, densities of electric lines between the second electrodes 122 and the third electrodes 123 are getting denser. When the finger 123 approximates the third electrodes 123, more charges would be influenced by the finger 139 so as that chances of detecting the finger 139 are increased subsequently.

Optional step 810: in order to shielding electromagnetic interference from below, it may have the driving circuit module 112 ground all of the first electrodes 121 or connect all of the first electrodes to a fixed potential. Next, the flow proceeds to step 820.

Step 820: have the driving circuit module 112 take turns to drive one of the second electrodes 122 which is not being driven sequentially or randomly. During at least a part of the execution of step 820, executing step 830. In order to prevent periodically interfere with other components, it may pick up one of the second electrodes 122 which is not being driven in random. In one embodiment, the second electrodes which are not driven may be grounded or connected to a fixed potential in order to reduce electromagnetic interference.

Step 830: have the sensing circuit module 113 to sense all the third electrodes 113 to generate an one-dimensional array. As discussed already, the one-dimensional array generated at step 830 may be composed of sensing values, difference values or dual difference values. The difference values or the dual difference values generated by AFE circuits are more resistant to interference.

Step 840: determining whether all the second electrodes 122 are being driven. If the second electrodes 122 corresponding to a detection area are all driven, the flow proceeds to step 850. Otherwise, the flow returns to step 820.

Step 850: forming a two-dimensional array by the one-dimensional arrays with respect to their second electrodes 122. Since each of the one-dimensional arrays is corresponding to a particular second electrode 122, the two-dimensional array may be formed by the one-dimensional arrays according to positions of corresponding second electrodes 122.

Step 860: calculating an approximating event according to the two-dimensional array. As the one-dimensional arrays and the two-dimension array may be composed of sensing values, difference values or dual difference values. Person having ordinary skill in the art can understand that zero or more approximating events may be calculated according to the two-dimensional array.

Figure 9:
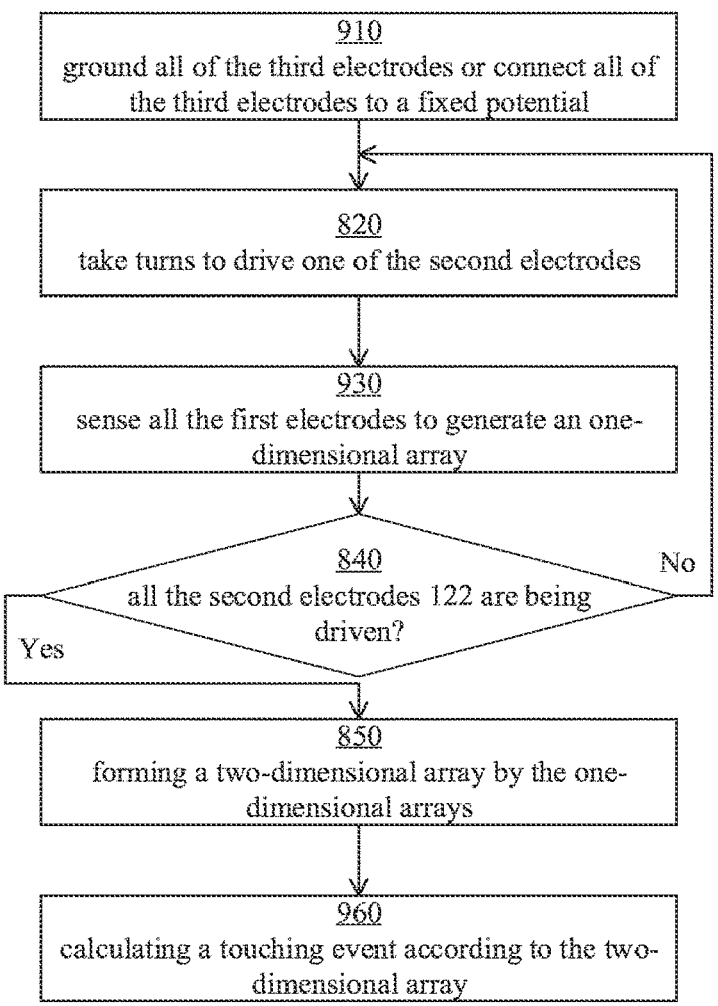
FIG. 9, which depicts a flowchart diagram of a touch sensitive processing method according to an embodiment of the present invention.

Please refer to FIG. 9, which depicts a flowchart diagram of a touch sensitive processing method 900 according to an embodiment of the present invention. The touch sensitive processing method 900 may be implemented by the touch sensitive processing apparatus 110 and applicable to the embodiment as shown in FIG. 7. In one embodiment, the touch sensitive processing method 900 is implemented as instructions stored in non-volatile memory for execution by the processor module 114. Unless there exists a causal relation, the present application does not limit execution sequence between any two steps. The touch sensitive processing method 900 uses some aforementioned steps. Unless they are described particularly, these steps keep aforementioned features. The touch sensitive processing method 900 may begin at step 910.

As mentioned above, the touch sensitive processing method 900 utilizes mutual-capacitance changes between the second electrodes 122 and the third electrodes 123 to detect a touching position. In order to increase sensitivities of mutual-capacitance effects, in one embodiment, an area of each second electrode 122 may be increased. For examples, a total area of all the second electrodes 122 may occupy a proportion of an area of the touch screen 120. The proportion may be 80%, 85%, 90% or 95%. In an alternative embodiment, the total area of all the second electrodes 122 is larger than a total area of all the third electrodes 123. Or, the total area of all the second electrodes 122 is larger than a total area of all the first electrodes 121. Since areas of the second electrodes 122 are increased, densities of electric lines between the second electrodes 122 and the first electrodes 121 are getting denser. Hence, when the finger 139 compresses distances between the first electrodes 121 and the second electrodes 122, more charges of the electric lines would be influenced by the finger 139 so as that chances of detecting the finger 139 are increased subsequently.

Step 910: in order to shield electromagnetic interference from above, it may have the driving circuit module 112 to ground all the third electrodes 123 or to connect all the third electrodes 123 with a fixed potential. In one embodiment, an area of each third electrode 123 may be increased. For examples, in the embodiments as shown in FIGS. 3A and 3B, a total area of all third electrodes 123 may occupy a proportion of a total area of the touch screen 120. The proportion may be 80%, 85%, 90% or 95%. In an alternative embodiment, the total area of all third electrodes 123 is larger than a total area of all second electrodes 122. Or, alternatively, the total area of all third electrodes 123 is larger than a total of all first electrodes 121. Next, the flow proceeds to step 820 and step 930.

Step 930: have the sensing circuit module 113 to sense all the first electrodes 121 to generate an one-dimensional array. As discussed already, the one-dimensional array generated at step 930 may be composed of sensing values, difference values or dual difference values. The difference values or the dual difference values generated by AFE circuits are more resistant to interference.

Step 960: calculating a touching event according to the two-dimensional array. As discussed already, the one-dimensional arrays and the two-dimension array may be composed of sensing values, difference values or dual difference values. Since the external conductive object 139 may apply different pressures, deformations of the elastic dielectric layer 124 are varied accordingly. When the second electrodes 122 are closer to the first electrodes 121, changes of the capacitances are getting larger. Hence, according to quantities of the changes, the pressure applied by the external conductive object 139 may be calculated. In one embodiment, with regard to each of touching events, a corresponding pressure value may be calculated accordingly. Person having ordinary skill in the art can understand that zero or more touching events may be calculated according to the two-dimensional array.

Since all of the first electrodes 121 are grounded or being connected to a fixed potential at the step 810 of the touch sensitive processing method 800 and all of the third electrodes 123 are grounded or being connected to a fixed potential at the step 910 of the touch sensitive processing method 900, these two touch sensitive processing methods 800 and 900 must be performed separately. They cannot be executed simultaneously. In one embodiment, when the touch sensitive processing method 800 detects an approximating event, it may further execute step 560 for reporting the approximating event to the host 140. When the touch sensitive processing method 900 detects a touching event, it may further execute step 570 for reporting the touching event to the host 140. However, if it is desired to reduce the reports, when the touching event and the approximating event are corresponding to one external conductive object, it may only report the touching event to the host.

Figure 10:
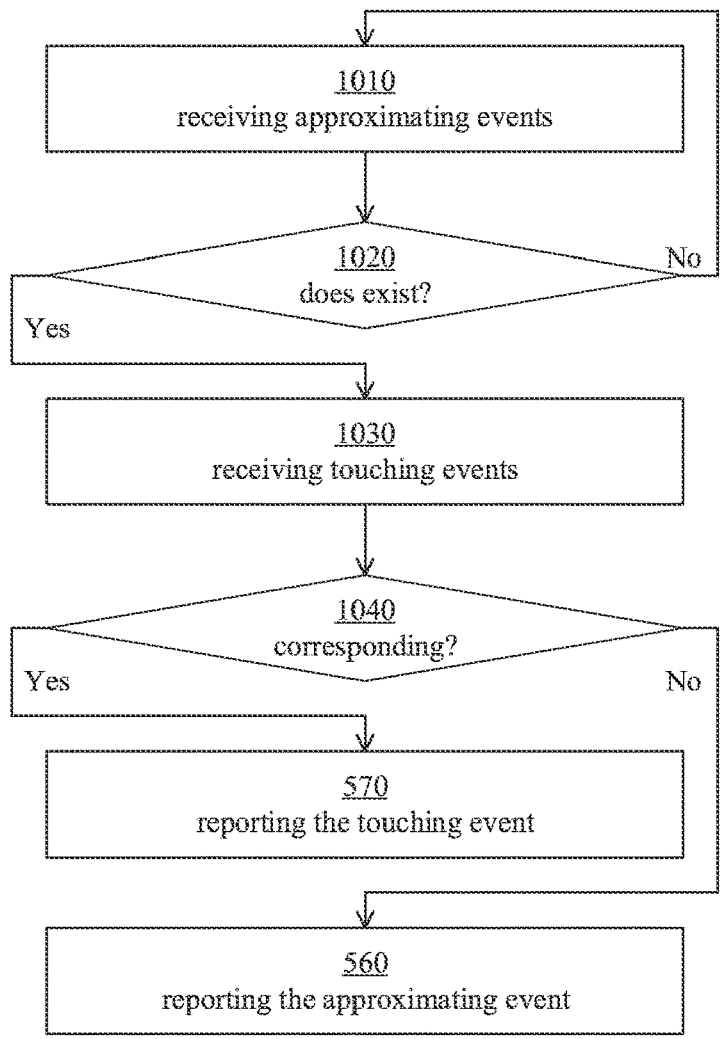
FIG. 10, which depicts a flowchart diagram of a touch sensitive processing method according to an embodiment of the present invention.

Please refer to FIG. 10, which depicts a flowchart diagram of a touch sensitive processing method 1000 according to an embodiment of the present invention. The touch sensitive processing method 1000 may be implemented by the touch sensitive processing apparatus 110 and applicable to the embodiment as shown in FIG. 7. In one embodiment, the touch sensitive processing method 1000 is implemented as instructions stored in non-volatile memory for execution by the processor module 114. Unless there exists a causal relation, the present application does not limit execution sequence between any two steps. The touch sensitive processing method 1000 uses some aforementioned steps. Unless they are described particularly, these steps keep aforementioned features. The touch sensitive processing method 1000 may begin at step 1010.

Step 1010: receiving approximating events. It may use the touch sensitive processing method 800 to obtain zero or more approximating events.

Step 1020: determining whether there exists at least one approximating event. When one or more approximating events are received, the flow may proceed to step 1030. Otherwise, the flow may return to step 1010.

Step 1030: receiving touching events. It may use the touch sensitive processing method 900 to obtain zero or more touching events.

Step 1040: determining whether there exists at least one touching event corresponding to the approximating event. When it is determined that the touching event is corresponding to the approximating event, it implies that the external conducive object applies pressure to the touch screen, the flow may proceed to step 570. Otherwise, it implies that the external conducive object applies no pressure to the touch screen, the flow may proceed to step 560.

According to an embodiment of the present invention, a touch sensitive processing method is provided. The touch sensitive processing method applicable to a touch panel which sequentially includes a layer of third electrodes, an elastic dielectric layer and at least one layer of touch electrodes, wherein the layer of third electrodes includes multiple parallel third electrodes, the at least one layer of touch electrodes includes multiple first electrodes in parallel to a first axis and multiple second electrodes in parallel to a second axis, each of the first electrode intersects with the second electrodes, wherein the touch sensitive method comprising: performing self-capacitance sensing via the third electrodes in order to get an one-dimensional array composing sensing information corresponding to each of the third electrodes; detecting a first approximating event corresponding to a first conductive object according to the one-dimensional array and a base one-dimensional array, wherein a distance between the layer of third electrodes and the first conductive object is less than a distance between the layer of touch electrodes and first conductive object; and when the first approximating event is detected, performing following steps: performing mutual-capacitance sensing via the first electrodes and the second electrodes in order to get a two-dimensional array; detecting a first touching event corresponding to the first external conductive object according to the two-dimensional array; and reporting the first approximating event to a host when the first touching event is not detected.

Preferably, in order to report a touching event in case it is detected by the mutual-capacitance sensing, the touch sensitive processing method further comprises reporting the first touching event to the host when the first touching event is detected.

Preferably, in order to accelerate the mutual-capacitance sensing according to the sensing results corresponding to the third electrodes, the third electrodes are in parallel to the first axis, the mutual-capacitance sensing step comprises emitting driving signals via some of the first electrodes nearby the first approximating event and sensing the driving signals via the second electrodes in a time-sharing manner in order to get the two-dimensional array.

Preferably, in order to report a plurality of approximating or touching events, the touch sensitive processing method further comprises: when a second approximating event corresponding to a second external conductive object is detected according to the one-dimensional array and the base one-dimensional array, detecting a second touching event corresponding to the second external conductive object according to the two-dimensional array; reporting the second approximating event to the host when the second touching event is not detected; and reporting the second touching event to the host when the second touching event is detected, wherein the first approximating event and the second approximating event are corresponding to different third electrodes.

Preferably, in order to detect multiple external conductive objects nearby the same third electrode, the touch sensitive processing method further comprises: detecting a second touching event corresponding to a second external conductive object according to the two-dimensional array; determining whether the first touching event and the second touching event are corresponding to one of the third electrodes corresponding to the first approximating event; and reporting the second touching event to the host when it is determined that the first touching event and the second touching event are corresponding to one of the third electrodes corresponding to the first approximating event.

Preferably, in order to calculate a pressure value corresponding to the touching event by considering compression degree of the elastic dielectric layer, the touch sensitive processing method further comprises calculating a pressure value corresponding to the first touching event according to elements of the two-dimensional array corresponding to the first touching event.

Preferably, in order to dissipate charges of the driving signals to the external conductive object via the first electrodes and the third electrodes, a total area of the third electrodes is more than 80% of an area of the touch panel.

According to one embodiment of the present application, a touch sensitive processing apparatus is provided. The touch sensitive processing apparatus applicable to a touch panel which sequentially includes a layer of third electrodes, an elastic dielectric layer and at least one layer of touch electrodes, wherein the layer of third electrodes includes multiple parallel third electrodes, the at least one layer of touch electrodes includes multiple first electrodes in parallel to a first axis and multiple second electrodes in parallel to a second axis, each of the first electrode intersects with the second electrodes, wherein the touch sensitive apparatus comprising: an interconnection network module, configured to connect to one or more of the first, the second and the third electrodes; a driving circuit module, configured to transmit driving signals via the interconnection network module; a sensing circuit module, configured to sense induced driving signals via the interconnection network module; a processor module, coupled to the interconnection network module, the driving circuit module and the sensing circuit module, configured to execute instructions stored in non-volatile memory to realize following steps: have the driving circuit module and the sensing circuit module through the interconnection network performing self-capacitance sensing via the third electrodes in order to get an one-dimensional array composing sensing information corresponding to each of the third electrodes; detecting a first approximating event corresponding to a first conductive object according to the one-dimensional array and a base one-dimensional array, wherein a distance between the layer of third electrodes and the first conductive object is less than a distance between the layer of touch electrodes and first conductive object; and when the first approximating event is detected, performing following steps: have the driving circuit module and the sensing circuit module through the interconnection network performing mutual-capacitance sensing via the first electrodes and the second electrodes in order to get a two-dimensional array; detecting a first touching event corresponding to the first external conductive object according to the two-dimensional array; and reporting the first approximating event to a host when the first touching event is not detected.

Preferably, in order to report a touching event in case it is detected by the mutual-capacitance sensing, the processor module is further configured for reporting the first touching event to the host when the first touching event is detected.

Preferably, in order to accelerate the mutual-capacitance sensing according to the sensing results corresponding to the third electrodes, the third electrodes are in parallel to the first axis, the mutual-capacitance sensing step comprises the driving circuit module to emit driving signals via some of the first electrodes nearby the first approximating event and the sensing circuit module to sense the driving signals via the second electrodes in a time-sharing manner in order to get the two-dimensional array.

Preferably, in order to report a plurality of approximating or touching events, the processor module is further configured for: when a second approximating event corresponding to a second external conductive object is detected according to the one-dimensional array and the base one-dimensional array, detecting a second touching event corresponding to the second external conductive object according to the two-dimensional array; reporting the second approximating event to the host when the second touching event is not detected; and reporting the second touching event to the host when the second touching event is detected, wherein the first approximating event and the second approximating event are corresponding to different third electrodes.

Preferably, in order to detect multiple external conductive objects nearby the same third electrode, the processor module is further configured for: detecting a second touching event corresponding to a second external conductive object according to the two-dimensional array; determining whether the first touching event and the second touching event are corresponding to one of the third electrodes corresponding to the first approximating event; and reporting the second touching event to the host when it is determined that the first touching event and the second touching event are corresponding to one of the third electrodes corresponding to the first approximating event.

Preferably, in order to calculate a pressure value corresponding to the touching event by considering compression degree of the elastic dielectric layer, the processor module is further configured for calculating a pressure value corresponding to the first touching event according to elements of the two-dimensional array corresponding to the first touching event.

Preferably, in order to dissipate charges of the driving signals to the external conductive object via the first electrodes and the third electrodes, a total area of the third electrodes is more than 80% of an area of the touch panel.

According to an embodiment of the present invention, a touch system is provided. The touch system comprising the aforementioned touch panel and the touch sensitive processing apparatus.

According to an embodiment of the present invention, a touch sensitive processing method is provided. The touch sensitive processing method applicable to a touch panel which sequentially includes a layer of third electrodes, an elastic dielectric layer and at least one layer of touch electrodes, wherein the layer of third electrodes includes multiple parallel third electrodes, the at least one layer of touch electrodes includes multiple first electrodes in parallel to a first axis and multiple second electrodes in parallel to a second axis, each of the first electrode intersects with the second electrodes, wherein the touch sensitive method comprising: performing self-capacitance sensing via the third electrodes in order to get a first one-dimensional array composing sensing information corresponding to each of first ends of the third electrodes, and performing self-capacitance sensing via the third electrodes in order to get a second one-dimensional array composing sensing information corresponding to each of second ends of the third electrodes; detecting a first approximating event corresponding to a first conductive object according to the first one-dimensional array and the second one-dimensional array, wherein a distance between the layer of third electrodes and the first conductive object is less than a distance between the layer of touch electrodes and first conductive object; and when the first approximating event is detected, performing following steps: performing mutual-capacitance sensing via the first electrodes and the second electrodes in order to get a two-dimensional array; detecting a first touching event corresponding to the first external conductive object according to the two-dimensional array; and reporting the first approximating event to a host when the first touching event is not detected.

Preferably, in order to report a touching event in case it is detected by the mutual-capacitance sensing, the touch sensitive processing method further comprises: reporting the first touching event to the host when the first touching event is detected.

Preferably, in order to accelerate the mutual-capacitance sensing according to the sensing results corresponding to the third electrodes, the third electrodes are in parallel to the first axis, the mutual-capacitance sensing step comprises emitting driving signals via some of the first electrodes nearby the first approximating event and sensing the driving signals via the second electrodes in a time-sharing manner in order to get the two-dimensional array.

Preferably, in order to report a plurality of approximating or touching events, the touch sensitive processing method further comprises: when a second approximating event corresponding to a second external conductive object is detected according to the first one-dimensional array and the second one-dimensional array, detecting a second touching event corresponding to the second external conductive object according to the two-dimensional array; reporting the second approximating event to the host when the second touching event is not detected; and reporting the second touching event to the host when the second touching event is detected, wherein the first approximating event and the second approximating event are corresponding to different third electrodes.

Preferably, in order to detect multiple external conductive objects nearby the same third electrode, the touch sensitive processing method further comprises: detecting a second touching event corresponding to a second external conductive object according to the two-dimensional array; determining whether the first touching event and the second touching event are corresponding to one of the third electrodes corresponding to the first approximating event; and reporting the second touching event to the host when it is determined that the first touching event and the second touching event are corresponding to one of the third electrodes corresponding to the first approximating event.

Preferably, in order to calculate a pressure value corresponding to the touching event by considering compression degree of the elastic dielectric layer, the touch sensitive processing method further comprises calculating a pressure value corresponding to the first touching event according to elements of the two-dimensional array corresponding to the first touching event.

Preferably, in order to dissipate charges of the driving signals to the external conductive object via the first electrodes and the third electrodes, a total area of the third electrodes is more than 80% of an area of the touch panel.

Preferably, in order to provide more information of the approximating event, the first approximating event includes a pair of coordinates with respect to the touch panel.

According to an embodiment of the present invention, a touch sensitive processing apparatus is provided. The touch sensitive processing apparatus applicable to a touch panel which sequentially includes a layer of third electrodes, an elastic dielectric layer and at least one layer of touch electrodes, wherein the layer of third electrodes includes multiple parallel third electrodes, the at least one layer of touch electrodes includes multiple first electrodes in parallel to a first axis and multiple second electrodes in parallel to a second axis, each of the first electrode intersects with the second electrodes, wherein the touch sensitive apparatus comprising: an interconnection network module, configured to connect to one or more of the first electrodes, the second electrodes, first ends and second ends of the third electrodes; a driving circuit module, configured to transmit driving signals via the interconnection network module; a sensing circuit module, configured to sense induced driving signals via the interconnection network module; a processor module, coupled to the interconnection network module, the driving circuit module and the sensing circuit module, configured to execute instructions stored in non-volatile memory to realize following steps: have the driving circuit module and the sensing circuit module through the interconnection network performing self-capacitance sensing via the third electrodes in order to get a first one-dimensional array composing sensing information corresponding to each of the first ends of the third electrodes, and have the driving circuit module and the sensing circuit module through the interconnection network performing self-capacitance sensing via the third electrodes in order to get a second one-dimensional array composing sensing information corresponding to each of the second ends of the third electrodes; detecting a first approximating event corresponding to a first conductive object according to the first one-dimensional array and the second one-dimensional array, wherein a distance between the layer of third electrodes and the first conductive object is less than a distance between the layer of touch electrodes and first conductive object; and when the first approximating event is detected, performing following steps: have the driving circuit module and the sensing circuit module through the interconnection network performing mutual-capacitance sensing via the first electrodes and the second electrodes in order to get a two-dimensional array; detecting a first touching event corresponding to the first external conductive object according to the two-dimensional array; and reporting the first approximating event to a host when the first touching event is not detected.

Preferably, in order to report a touching event in case it is detected by the mutual-capacitance sensing, the processor module is further configured for reporting the first touching event to the host when the first touching event is detected.

Preferably, in order to accelerate the mutual-capacitance sensing according to the sensing results corresponding to the third electrodes, the third electrodes are in parallel to the first axis, the mutual-capacitance sensing step comprises the driving circuit module to emit driving signals via some of the first electrodes nearby the first approximating event and the sensing circuit module to sense the driving signals via the second electrodes in a time-sharing manner in order to get the two-dimensional array.

Preferably, in order to report a plurality of approximating or touching events, the processor module is further configured for when a second approximating event corresponding to a second external conductive object is detected according to the first one-dimensional array and the second one-dimensional array, detecting a second touching event corresponding to the second external conductive object according to the two-dimensional array; reporting the second approximating event to the host when the second touching event is not detected; and reporting the second touching event to the host when the second touching event is detected, wherein the first approximating event and the second approximating event are corresponding to different third electrodes.

Preferably, in order to detect multiple external conductive objects nearby the same third electrode, the processor module is further configured for detecting a second touching event corresponding to a second external conductive object according to the two-dimensional array; determining whether the first touching event and the second touching event are corresponding to one of the third electrodes corresponding to the first approximating event; and reporting the second touching event to the host when it is determined that the first touching event and the second touching event are corresponding to one of the third electrodes corresponding to the first approximating event.

Preferably, in order to calculate a pressure value corresponding to the touching event by considering compression degree of the elastic dielectric layer, the processor module is further configured for calculating a pressure value corresponding to the first touching event according to elements of the two-dimensional array corresponding to the first touching event.

Preferably, in order to dissipate charges of the driving signals to the external conductive object via the first electrodes and the third electrodes, a total area of the third electrodes is more than 80% of an area of the touch panel.

Preferably, in order to provide more information of the approximating event, the first approximating event includes a pair of coordinates with respect to the touch panel.

According to an embodiment of the present invention, a touch system is provided. The touch system comprising the aforementioned touch panel and the touch sensitive processing apparatus.

According to an embodiment of the present invention, a touch sensitive method is provided. The touch sensitive processing method applicable to a touch panel which sequentially includes a layer of third electrodes, a dielectric layer, a layer of second electrodes, an elastic dielectric layer and a layer of first electrodes, wherein the layer of third electrodes includes multiple third electrodes in parallel to a first axis, the layer of second electrodes includes multiple second electrodes in parallel to a second axis, the layer of first electrodes includes multiple first electrodes in parallel to the first axis, each of the first electrode intersects with the second electrodes, each of the second electrode intersects with the third electrodes, the third electrodes are closer to an external conductive object than the first electrodes, wherein the touch sensitive method comprising: connecting the first electrodes to a fixed potential; taking turns to drive the second electrodes while sensing via the third electrodes in order to get multiple one-dimensional arrays of third-electrode sensing information; forming a two-dimensional array of third-electrode sensing information by the one-dimensional arrays of third-electrode sensing information according to the second electrodes corresponding to the one-dimensional arrays of third-electrode sensing information; and calculating an approximating event according to the two-dimensional array of third-electrode sensing information.

Preferably, in order to detect touching events with pressure information and to reduce electromagnetic interference brought by an external conductive object touches the touch panel, when one or more approximating events are calculated, the touch sensitive processing method further comprises: connecting the third electrodes to a fixed potential; taking turns to drive the second electrodes while sensing via the first electrodes in order to get multiple one-dimensional arrays of first-electrode sensing information; forming a two-dimensional array of first-electrode sensing information by the one-dimensional arrays of first-electrode sensing information according to the second electrodes corresponding to the one-dimensional arrays of first-electrode sensing information; and calculating a touching event according to the two-dimensional array of first-electrode sensing information.

Preferably, in order to prevent duplicated reports the approximating event and the touching event corresponding to the same external conductive object, the touch sensitive processing method further comprises: determining whether there exists the touching event corresponding to each of the approximating events; when it is determined that there exists the touching event corresponding to the approximating event, reporting the corresponding touching event to a host; and when it is determined that there does not exist the touching event corresponding to the approximating event, reporting the approximating event to the host.

Preferably, in order to provide pressure value to the host, the touch sensitive processing method further comprises: calculating a pressure value corresponding to the touching event according to the two-dimensional array of first-electrode sensing information.

Preferably, in order to reduce electromagnetic interference from other second electrodes which are not being driven but affected by the driving signals to the second electrode being driven, the touch sensitive processing method further comprises: when taking turns to drive the second electrodes, connecting the second electrodes which are not being driven to a fixed potential.

Preferably, in order to reduce sensitivities of electromagnetic interference, the one-dimensional array of third-electrode sensing information comprises a difference value of sensing values of two adjacent third electrodes or a dual difference value of sensing values of three adjacent third electrodes.

Preferably, in order to reduce sensitivities of electromagnetic interference, the one-dimensional array of first-electrode sensing information comprises a difference value of sensing values of two adjacent first electrodes or a dual difference value of sensing values of three adjacent first electrodes.

Preferably, in order to prevent electromagnetic interference during detections of touching events and to increase detection sensitivities of approximating events, a total area of the third electrodes is more than 80% or a total area of the touch panel.

Preferably, in order to simplifies designs of the sensing circuit module and consistency and convenience in calculations of approximating events and touching events, a quantity of the third electrodes equals to a quantity of the first electrodes, and a distance between center lines of adjacent third electrodes equals to a distance between center lines of adjacent first electrodes.

Preferably, in order to increase detection sensitivities of approximating events and touching events, a total area of the second electrodes is more than 80% or a total area of the touch panel.

According to an embodiment of the present invention, a touch sensitive processing apparatus is provided. The touch sensitive processing apparatus applicable to a touch panel which sequentially includes a layer of third electrodes, a dielectric layer, a layer of second electrodes, an elastic dielectric layer and a layer of first electrodes, wherein the layer of third electrodes includes multiple third electrodes in parallel to a first axis, the layer of second electrodes includes multiple second electrodes in parallel to a second axis, the layer of first electrodes includes multiple first electrodes in parallel to the first axis, each of the first electrode intersects with the second electrodes, each of the second electrode intersects with the third electrodes, the third electrodes are closer to an external conductive object than the first electrodes, wherein the touch sensitive apparatus comprising: an interconnection network module, configured to connect to one or more the first electrodes, one or more the second electrodes and one or more the third electrodes, respectively; a driving circuit module, configured to emit driving signals via the interconnection network module; a sensing circuit module, configured to sensing induced driving signals via the interconnection network module; and a processor module, coupled to the interconnection network module, the driving circuit module and the sensing circuit module, configured to execute instructions stored in volatile memory to realize following steps: connecting the first electrodes to a fixed potential; having the driving circuit module taking turns to drive the second electrodes while having the sensing circuit module sensing via the third electrodes in order to get multiple one-dimensional arrays of third-electrode sensing information; forming a two-dimensional array of third-electrode sensing information by the one-dimensional arrays of third-electrode sensing information according to the second electrodes corresponding to the one-dimensional arrays of third-electrode sensing information; and calculating an approximating event according to the two-dimensional array of third-electrode sensing information.

Preferably, in order to detect touching events with pressure information and to reduce electromagnetic interference brought by an external conductive object touches the touch panel, when one or more approximating events are calculated, the processor module is further configured to realize following steps: connecting the third electrodes to a fixed potential; having the driving circuit module taking turns to drive the second electrodes while having the sensing circuit module sensing via the first electrodes in order to get multiple one-dimensional arrays of first-electrode sensing information; forming a two-dimensional array of first-electrode sensing information by the one-dimensional arrays of first-electrode sensing information according to the second electrodes corresponding to the one-dimensional arrays of first-electrode sensing information; and calculating a touching event according to the two-dimensional array of first-electrode sensing information.

Preferably, in order to prevent duplicated reports the approximating event and the touching event corresponding to the same external conductive object, the processor module is further configured to realize following steps: determining whether there exists the touching event corresponding to each of the approximating events; when it is determined that there exists the touching event corresponding to the approximating event, reporting the corresponding touching event to a host; and when it is determined that there does not exist the touching event corresponding to the approximating event, reporting the approximating event to the host.

Preferably, in order to provide pressure value to the host, the processor module is further configured to realize following steps: calculating a pressure value corresponding to the touching event according to the two-dimensional array of first-electrode sensing information.

Preferably, in order to reduce electromagnetic interference from other second electrodes which are not being driven but affected by the driving signals to the second electrode being driven, the processor module is further configured to realize following steps: when the driving circuit module taking turns to drive the second electrodes, connecting the second electrodes which are not being driven to a fixed potential.

Preferably, in order to reduce sensitivities of electromagnetic interference, the one-dimensional array of third-electrode sensing information comprises a difference value of sensing values of two adjacent third electrodes or a dual difference value of sensing values of three adjacent third electrodes.

Preferably, in order to reduce sensitivities of electromagnetic interference, the one-dimensional array of first-electrode sensing information comprises a difference value of sensing values of two adjacent first electrodes or a dual difference value of sensing values of three adjacent first electrodes.

Preferably, in order to prevent electromagnetic interference during detections of touching events and to increase detection sensitivities of approximating events, a total area of the third electrodes is more than 80% or a total area of the touch panel.

Preferably, in order to simplifies designs of the sensing circuit module and consistency and convenience in calculations of approximating events and touching events, a quantity of the third electrodes equals to a quantity of the first electrodes, and a distance between center lines of adjacent third electrodes equals to a distance between center lines of adjacent first electrodes.

Preferably, in order to increase detection sensitivities of approximating events and touching events, a total area of the second electrodes is more than 80% or a total area of the touch panel.

According to an embodiment of the present invention, a touch system is provided. The touch system comprising the aforementioned touch panel and the touch sensitive processing apparatus.

According to an embodiment of the present invention, a touch sensitive processing method is provided. The touch sensitive processing method applicable to a touch panel which sequentially includes a layer of third electrodes, a dielectric layer, a layer of second electrodes, an elastic dielectric layer and a layer of first electrodes, wherein the layer of third electrodes includes multiple third electrodes in parallel to a first axis, the layer of second electrodes includes multiple second electrodes in parallel to a second axis, the layer of first electrodes includes multiple first electrodes in parallel to the first axis, each of the first electrode intersects with the second electrodes, each of the second electrode intersects with the third electrodes, the third electrodes are closer to an external conductive object than the first electrodes, wherein the touch sensitive method comprising: connecting the third electrodes to a fixed potential; taking turns to drive the second electrodes while sensing via the first electrodes in order to get multiple one-dimensional arrays of first-electrode sensing information; forming a two-dimensional array of first-electrode sensing information by the one-dimensional arrays of first-electrode sensing information according to the second electrodes corresponding to the one-dimensional arrays of first-electrode sensing information; calculating a touching event according to the two-dimensional array of first-electrode sensing information; and reporting the touching event to a host.

According to an embodiment of the present invention, a touch sensitive processing apparatus is provided. The touch sensitive processing apparatus applicable to a touch panel which sequentially includes a layer of third electrodes, a dielectric layer, a layer of second electrodes, an elastic dielectric layer and a layer of first electrodes, wherein the layer of third electrodes includes multiple third electrodes in parallel to a first axis, the layer of second electrodes includes multiple second electrodes in parallel to a second axis, the layer of first electrodes includes multiple first electrodes in parallel to the first axis, each of the first electrode intersects with the second electrodes, each of the second electrode intersects with the third electrodes, the third electrodes are closer to an external conductive object than the first electrodes, wherein the touch sensitive apparatus comprising: an interconnection network module, configured to connect to one or more the first electrodes, one or more the second electrodes and one or more the third electrodes, respectively; a driving circuit module, configured to emit driving signals via the interconnection network module; a sensing circuit module, configured to sensing induced driving signals via the interconnection network module; and a processor module, coupled to the interconnection network module, the driving circuit module and the sensing circuit module, configured to execute instructions stored in volatile memory to realize following steps: connecting the third electrodes to a fixed potential; having the driving circuit module taking turns to drive the second electrodes while the sensing circuit module sensing via the first electrodes in order to get multiple one-dimensional arrays of first-electrode sensing information; forming a two-dimensional array of first-electrode sensing information by the one-dimensional arrays of first-electrode sensing information according to the second electrodes corresponding to the one-dimensional arrays of first-electrode sensing information; calculating a touching event according to the two-dimensional array of first-electrode sensing information; and reporting the touching event to a host.

According to an embodiment of the present invention, a touch system is provided. The touch system comprising the aforementioned touch panel and the touch sensitive processing apparatus.

The touch system, the touch sensitive processing apparatus and method provided by the present application can distinguish whether the external conductive object approximates or contacts the touch screen so as the host can increase types of responsive activities with respect to different kinds of input corresponding to one position. Thus, the functionalities of the touch system are increased to enrich user's experience.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch sensitive processing method applicable to a touch panel which sequentially includes a layer of third electrodes, a dielectric layer, a layer of second electrodes, an elastic dielectric layer and a layer of first electrodes, wherein the layer of third electrodes includes multiple third electrodes in parallel to a first axis, the layer of second electrodes includes multiple second electrodes in parallel to a second axis, the layer of first electrodes includes multiple first electrodes in parallel to the first axis, each of the first electrode intersects with the second electrodes, each of the second electrode intersects with the third electrodes, the third electrodes are closer to an external conductive object than the first electrodes, wherein the touch sensitive method comprising:

connecting the first electrodes to a fixed potential;
taking turns to drive the second electrodes while sensing via the third electrodes in order to get multiple one-dimensional arrays of third-electrode sensing information;
when taking turns to drive the second electrodes, connecting the second electrodes which are not being driven to a fixed potential;
forming a two-dimensional array of third-electrode sensing information by the one-dimensional arrays of third-electrode sensing information according to the second electrodes corresponding to the one-dimensional arrays of third-electrode sensing information; and
calculating an approximating event according to the two-dimensional array of third-electrode sensing information.

2. The touch sensitive processing method as claimed in claim 1, wherein when one or more approximating events are calculated, the touch sensitive processing method further comprises:
connecting the third electrodes to a fixed potential;
taking turns to drive the second electrodes while sensing via the first electrodes in order to get multiple one-dimensional arrays of first-electrode sensing information;
forming a two-dimensional array of first-electrode sensing information by the one-dimensional arrays of first-electrode sensing information according to the second electrodes corresponding to the one-dimensional arrays of first-electrode sensing information; and
calculating a touching event according to the two-dimensional array of first-electrode sensing information.

3. The touch sensitive processing method as claimed in claim 2, further comprises:
determining whether there exists the touching event corresponding to each of the approximating events;
when it is determined that there exists the touching event corresponding to the approximating event, reporting the corresponding touching event to a host; and
when it is determined that there does not exist the touching event corresponding to the approximating event, reporting the approximating event to the host.

4. The touch sensitive processing method as claimed in claim 2, further comprises:
calculating a pressure value corresponding to the touching event according to the two-dimensional array of first-electrode sensing information.

5. The touch sensitive processing method as claimed in claim 1, wherein the one-dimensional array of third-electrode sensing information comprises a difference value of sensing values of two adjacent third electrodes or a dual difference value of sensing values of three adjacent third electrodes.

6. The touch sensitive processing method as claimed in claim 2, wherein the one-dimensional array of first-electrode sensing information comprises a difference value of sensing values of two adjacent first electrodes or a dual difference value of sensing values of three adjacent first electrodes.

7. The touch sensitive processing method as claimed in claim 1, wherein a total area of the third electrodes is more than 80% or a total area of the touch panel.

8. The touch sensitive processing method as claimed in claim 7, wherein a quantity of the third electrodes equals to a quantity of the first electrodes, and a distance between center lines of adjacent third electrodes equals to a distance between center lines of adjacent first electrodes.

9. The touch sensitive processing method as claimed in claim 1, wherein a total area of the second electrodes is more than 80% or a total area of the touch panel.

10. A touch sensitive processing apparatus applicable to a touch panel which sequentially includes a layer of third electrodes, a dielectric layer, a layer of second electrodes, an elastic dielectric layer and a layer of first electrodes, wherein the layer of third electrodes includes multiple third electrodes in parallel to a first axis, the layer of second electrodes includes multiple second electrodes in parallel to a second axis, the layer of first electrodes includes multiple first electrodes in parallel to the first axis, each of the first electrode intersects with the second electrodes, each of the second electrode intersects with the third electrodes, the third electrodes are closer to an external conductive object than the first electrodes, wherein the touch sensitive apparatus comprising:
- an interconnection network module, configured to connect to one or more the first electrodes, one or more the second electrodes and one or more the third electrodes, respectively;
- a driving circuit module, configured to emit driving signals via the interconnection network module;
- a sensing circuit module, configured to sensing induced driving signals via the interconnection network module; and
- a processor module, coupled to the interconnection network module, the driving circuit module and the sensing circuit module, configured to execute instructions stored in volatile memory to realize following steps:
- connecting the first electrodes to a fixed potential;
- having the driving circuit module taking turns to drive the second electrodes while having the sensing circuit module sensing via the third electrodes in order to get multiple one-dimensional arrays of third-electrode sensing information;
- when taking turns to drive the second electrodes, connecting the second electrodes which are not being driven to a fixed potential;
- forming a two-dimensional array of third-electrode sensing information by the one-dimensional arrays of third-electrode sensing information according to the second electrodes corresponding to the one-dimensional arrays of third-electrode sensing information; and
- calculating an approximating event according to the two-dimensional array of third-electrode sensing information.

11. The touch sensitive processing apparatus as claimed in claim 10, wherein when one or more approximating events are calculated, the processor module is further configured to realize following steps:
- connecting the third electrodes to a fixed potential;
- having the driving circuit module taking turns to drive the second electrodes while having the sensing circuit module sensing via the first electrodes in order to get multiple one-dimensional arrays of first-electrode sensing information;
- forming a two-dimensional array of first-electrode sensing information by the one-dimensional arrays of first-electrode sensing information according to the second electrodes corresponding to the one-dimensional arrays of first-electrode sensing information; and
- calculating a touching event according to the two-dimensional array of first-electrode sensing information.

12. The touch sensitive processing apparatus as claimed in claim 11, wherein the processor module is further configured to realize following steps:
- determining whether there exists the touching event corresponding to each of the approximating events;
- when it is determined that there exists the touching event corresponding to the approximating event, reporting the corresponding touching event to a host; and
- when it is determined that there does not exist the touching event corresponding to the approximating event, reporting the approximating event to the host.

13. The touch sensitive processing apparatus as claimed in claim 11, wherein the processor module is further configured to realize following steps:
- calculating a pressure value corresponding to the touching event according to the two-dimensional array of first-electrode sensing information.

14. The touch sensitive processing apparatus as claimed in claim 10, wherein the one-dimensional array of third-electrode sensing information comprises a difference value of sensing values of two adjacent third electrodes or a dual difference value of sensing values of three adjacent third electrodes.

15. The touch sensitive processing apparatus as claimed in claim 11, wherein the one-dimensional array of first-electrode sensing information comprises a difference value of sensing values of two adjacent first electrodes or a dual difference value of sensing values of three adjacent first electrodes.

16. The touch sensitive processing apparatus as claimed in claim 10, wherein a total area of the third electrodes is more than 80% or a total area of the touch panel.

17. The touch sensitive processing apparatus as claimed in claim 16, wherein a quantity of the third electrodes equals to a quantity of the first electrodes, and a distance between center lines of adjacent third electrodes equals to a distance between center lines of adjacent first electrodes.

18. The touch sensitive processing apparatus as claimed in claim 10, wherein a total area of the second electrodes is more than 80% or a total area of the touch panel.

19. A touch system, comprising:
- a touch panel which sequentially includes a layer of third electrodes, a dielectric layer, a layer of second electrodes, an elastic dielectric layer and a layer of first electrodes, wherein the layer of third electrodes includes multiple third electrodes in parallel to a first axis, the layer of second electrodes includes multiple second electrodes in parallel to a second axis, the layer of first electrodes includes multiple first electrodes in parallel to the first axis, each of the first electrode intersects with the second electrodes, each of the second electrode intersects with the third electrodes, the third electrodes are closer to an external conductive object than the first electrodes; and
- a touch sensitive processing apparatus, comprising:
- an interconnection network module, configured to connect to one or more the first electrodes, one or more the second electrodes and one or more the third electrodes, respectively;
- a driving circuit module, configured to emit driving signals via the interconnection network module;
- a sensing circuit module, configured to sensing induced driving signals via the interconnection network module; and
- a processor module, coupled to the interconnection network module, the driving circuit module and the sensing circuit module, configured to execute instructions stored in volatile memory to realize following steps:
- connecting the first electrodes to a fixed potential;
- having the driving circuit module taking turns to drive the second electrodes while having the sensing circuit module sensing via the third electrodes in order to get multiple one-dimensional arrays of third-electrode sensing information;

when taking turns to drive the second electrodes, connecting the second electrodes which are not being driven to a fixed potential;

forming a two-dimensional array of third-electrode sensing information by the one-dimensional arrays of third-electrode sensing information according to the second electrodes corresponding to the one-dimensional arrays of third-electrode sensing information; and calculating an approximating event according to the two-dimensional array of third-electrode sensing information.

* * * * *